US010511430B2

(12) United States Patent
Minn et al.

(10) Patent No.: US 10,511,430 B2
(45) Date of Patent: Dec. 17, 2019

(54) SPECTRUM-AGILE MULTIPLE INPUT MULTIPLE OUTPUT SYSTEM AND CAPACITY ADAPTATION BETWEEN UPLINK AND DOWNLINK

(71) Applicant: Board of Regents, The University of Texas System, Austin, TX (US)

(72) Inventors: Hlaing Minn, Allen, TX (US); Amin Khansefid, Dallas, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 200 days.

(21) Appl. No.: 15/632,135

(22) Filed: Jun. 23, 2017

(65) Prior Publication Data

US 2018/0013536 A1 Jan. 11, 2018

Related U.S. Application Data

(60) Provisional application No. 62/360,277, filed on Jul. 8, 2016.

(51) Int. Cl.
*H04W 4/00* (2018.01)
*H04L 5/14* (2006.01)
(Continued)

(52) U.S. Cl.
CPC ............ *H04L 5/14* (2013.01); *H04B 7/0413* (2013.01); *H04L 5/0048* (2013.01); *H04L 5/18* (2013.01);
(Continued)

(58) Field of Classification Search
None
See application file for complete search history.

(56) References Cited

U.S. PATENT DOCUMENTS

| 8,731,043 B2 | 5/2014 | Wu et al. |
| 8,837,607 B2 | 9/2014 | Frenne et al. |

(Continued)

FOREIGN PATENT DOCUMENTS

| EP | 2798748 A1 | 11/2014 |
| EP | 2947807 A1 | 11/2015 |

(Continued)

OTHER PUBLICATIONS

Jin et al. "On Massive MIMO Zero-Forcing Transceiver using Time-Shifted Pilots," IEEE Trans. Veh. Technol., vol. 9545, No. c, pp. 1-1, 2015.

(Continued)

*Primary Examiner* — Zewdu A Beyen
(74) *Attorney, Agent, or Firm* — Steinfl + Bruno LLP

(57) ABSTRACT

A multi-input multi-output rotating frequency division duplexing transceiver in non-contiguous bands comprising an adaptive duplex filter, a controller coupled to the adaptive duplex filter, wherein an uplink band and a downlink band are rotated before each transmission sub-frame, and wherein at least two of the bands are non-contiguous, a multi-output adaptive frequency synthesizer coupled to the controller, a transmit mixer coupled to the adaptive duplex filter and to the multi-output adaptive frequency synthesizer and a receive mixer coupled to the adaptive duplex filter and to the multi-output adaptive frequency synthesizer.

12 Claims, 19 Drawing Sheets

(51) Int. Cl.
  *H04B 7/0413* (2017.01)
  *H04L 27/26* (2006.01)
  *H04L 5/00* (2006.01)
  *H04L 5/18* (2006.01)
  *H04W 88/08* (2009.01)
  *H04W 88/02* (2009.01)

(52) U.S. Cl.
  CPC ......... *H04L 27/2613* (2013.01); *H04W 88/02* (2013.01); *H04W 88/08* (2013.01)

(56) References Cited

U.S. PATENT DOCUMENTS

| | | | |
|---|---|---|---|
| 8,971,434 B2 | 3/2015 | Frenne et al. | |
| 2005/0243748 A1 | 11/2005 | Bosch et al. | |
| 2011/0195675 A1* | 8/2011 | Nitsche | H04B 1/40 455/90.2 |
| 2012/0114065 A1* | 5/2012 | Luo | H04B 7/0426 375/295 |
| 2013/0163457 A1 | 6/2013 | Kim et al. | |
| 2013/0163544 A1 | 6/2013 | Lee et al. | |
| 2013/0265955 A1 | 10/2013 | Kim et al. | |
| 2013/0272263 A1 | 10/2013 | Pi et al. | |
| 2014/0241242 A1 | 8/2014 | Josiam et al. | |
| 2015/0207576 A1* | 7/2015 | Huang | H04B 17/0085 370/249 |
| 2015/0341152 A1 | 11/2015 | Kim et al. | |
| 2015/0372740 A1 | 12/2015 | Ko et al. | |
| 2015/0373736 A1 | 12/2015 | Ji et al. | |
| 2016/0050007 A1 | 2/2016 | Lee et al. | |
| 2016/0094324 A1 | 3/2016 | Lee et al. | |

FOREIGN PATENT DOCUMENTS

| | | |
|---|---|---|
| KR | 20130075311 A | 7/2013 |
| WO | 2014112779 A1 | 7/2014 |
| WO | 2014142516 A1 | 9/2014 |
| WO | 2014163451 A1 | 10/2014 |
| WO | 2014193070 A1 | 12/2014 |
| WO | 2015133784 A1 | 9/2015 |
| WO | 2016013889 A1 | 1/2016 |
| WO | 2016056805 A1 | 4/2016 |
| WO | 2016094324 A1 | 6/2016 |

OTHER PUBLICATIONS

Kong et al. "Channel Estimation under Staggered Frame Structure for Uplink Massive MIMO System", IEEE Trans. Wirel. Commun., vol. XX, No. 2, pp. 1-1, 2015.

Minn, Hlaing and Amin Khansefid. "Massive MIMO Systems in Non-Contiguous Bands with Asymmetric Traffics", IEEE Transactions on Wireless Communications, vol. 15, No. 7, Jul. 2016.

Yao et al. "Pilot contamination reduction by shifted frame structure in massive MIMO TDD wireless system", Wuhan Univ. J. Nat. Sci., vol. 20, No. 3, pp. 221-228, 2015.

Yin et al. "Enabling massive MIMO systems in the FDD mode thanks to D2D communications", Conf. Rec.—Asilomar Conf. Signals, Syst. Comput., vol. 2015—April, pp. 656-660, 2015.

\* cited by examiner

SPECTRUM-AGILE MULTIPLE INPUT MULTIPLE OUTPUT SYSTEM AND CAPACITY ADAPTATION BETWEEN UPLINK AND DOWNLINK

CROSS-REFERENCE TO RELATED APPLICATIONS

The present application claims priority to provisional U.S. Application No. 62/360,277 filed Jul. 8, 2016, entitled "Spectrum-Agile multiple input multiple output system and capacity adaptation between uplink and downlink", incorporated herein by reference in its entirety.

FEDERALLY SPONSORED RESEARCH OR DEVELOPMENT

This invention was made with government support under contract number AST1547048 awarded by the National Science Foundation. The government has certain rights in this invention.

TECHNOLOGY

The present disclosure relates generally to wireless communication. More particularly, an embodiment of the present disclosure relates to multiple input multiple output systems for non-contiguous bands.

BRIEF DESCRIPTION OF THE DRAWINGS

An embodiment of the instant disclosure is illustrated by way of example, and not in way by limitation, in the figures of the accompanying drawings and in which like reference numerals refer to similar elements and in which.

SUMMARY

Figure 1:
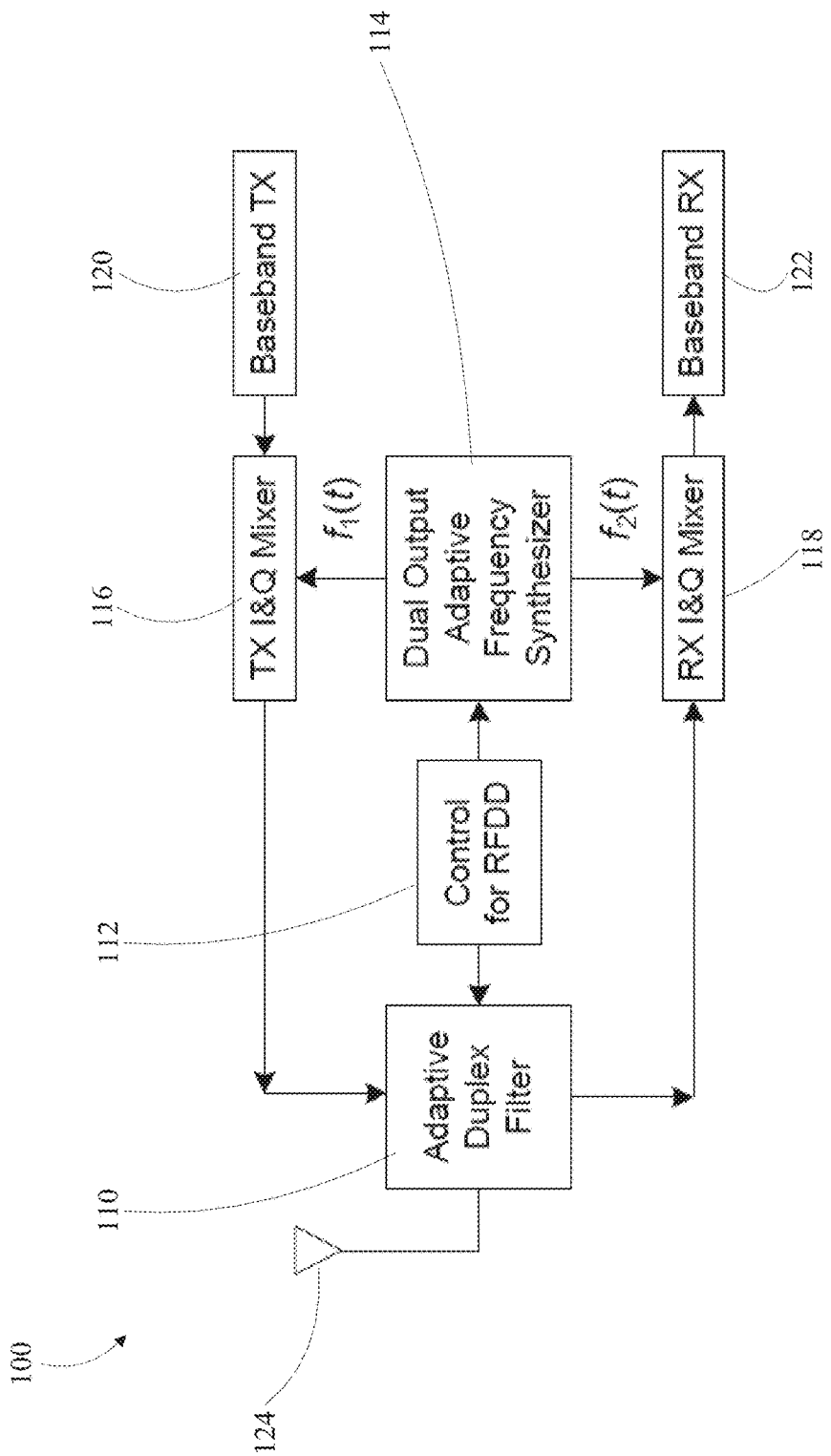
FIG. 1 depicts a transceiver system architecture example for rotating frequency division duplexing (RFDD) in accordance with an embodiment of the disclosure.

In a first aspect of the disclosure, a multi-input multi-output rotating frequency division duplexing transceiver in non-contiguous bands comprising an adaptive duplex filter, a controller coupled to the adaptive duplex filter, wherein an uplink band and a downlink band are rotated before each transmission sub-frame, and wherein at least two of the bands are non-contiguous, a multi-output adaptive frequency synthesizer coupled to the controller, a transmit mixer coupled to the adaptive duplex filter and to the multi-output adaptive frequency synthesizer and a receive mixer coupled to the adaptive duplex filter and to the multi-output adaptive frequency synthesizer.

In a second aspect of the disclosure, a method of multi-input multi-output rotating frequency division duplexing in non-contiguous bands comprising changing the values of two or more of the three parameters from a time interval to the next time interval of same or different duration for each band wherein the three parameters are the number of orthogonal frequency division multiplexing (OFDM) symbols per uplink (UL) sub-frame, that per downlink (DL) sub-frame, and that per frame (the combined UL sub-frame and DL sub-frame) and their values are fixed within the considered time interval before or after the occurrence of the change.

In a third aspect of the disclosure, a method of multi-input multi-output rotating frequency division duplexing in non-contiguous bands comprising changing the values of two or more of the three parameters across any of the sub-frames within a time interval for each band wherein the three parameters are the number of OFDM symbols per UL sub-frame, that per DL sub-frame, and that per frame (the combined UL sub-frame and DL sub-frame).

In a fourth aspect of the disclosure, a method of multi-input multi-output rotating frequency division duplexing in non-contiguous bands comprising two types of changing where the first type is the changing described in the above paragraph and the second type is changing the values of the set of the changing parameters from a time interval to the next time interval of same or different duration.

In a fifth aspect of the disclosure, a method of multi-input multi-output rotating frequency division duplexing in non-contiguous bands comprising setting a base station reference timeline based on a target coverage range or a user equipment at a cell edge and synchronizing a transmit timeline and a receive timeline of the user equipment having a propagation delay to the base station reference timeline.

In a sixth aspect of the disclosure, a method of multi-input multi-output rotating frequency division duplexing in non-contiguous bands comprising receiving/estimating channel state information for an uplink and a downlink from an uplink pilot signal in each band.

In a seventh aspect of the disclosure, a multi-input multi-output synchronous dual band time division duplexing transceiver in non-contiguous bands comprising a higher band transmit mixer, a lower band transmit mixer, an adder coupled to the higher band transmit mixer and the lower band transmit mixer, a higher band receive mixer, a lower band receive mixer, wherein at least two of the bands are non-contiguous and a switch coupled to the adder and the higher band receive mixer and the lower band receive mixer.

In an eighth aspect of the disclosure, a method of multi-input multi-output synchronous dual band time division duplexing in non-contiguous bands comprising changing the values of two or more of the three parameters from a time interval to the next time interval of same or different duration for each band (in the same way across bands) wherein the three parameters are the number of OFDM symbols per UL sub-frame, that per DL sub-frame, and that per frame (the combined UL sub-frame and DL sub-frame) and their values are fixed within the considered time interval before or after the occurrence of the change.

In a ninth aspect of the disclosure, a method of multi-input multi-output synchronous dual band time division duplexing in non-contiguous bands comprising changing the values of two or more of the three parameters across any of the sub-frames within a time interval for each band (in the same way across bands) wherein the three parameters are the number of OFDM symbols per UL sub-frame, that per DL sub-frame, and that per frame (the combined UL sub-frame and DL sub-frame).

In a tenth aspect of the disclosure, a method of multi-input multi-output synchronous dual band time division duplexing in non-contiguous bands comprising two types of changing where the first type is the changing described in and the second type is changing the values of the set of the changing parameters from a time interval to the next time interval of same or different duration.

In an eleventh aspect of the disclosure, a method of multi-input multi-output synchronous dual band time division duplexing in non-contiguous bands comprising receiving/estimating channel state information for an uplink and a downlink from an uplink pilot signal in each band.

In a twelfth aspect of the disclosure, a method of multi-input multi-output synchronous dual band time division duplexing in non-contiguous bands comprising setting a base station reference timeline based on a target coverage range or a user equipment at a cell edge and synchronizing a transmit timeline and a receive timeline of the user equipment having a propagation delay to the base station reference timeline.

In a thirteenth aspect of the disclosure, a multi-input multi-output asynchronous dual band time division duplex-ing transceiver in non-contiguous bands comprising a higher band receive mixer, a higher band transmit mixer, a higher band switch coupled to the higher band transmit mixer, a higher band controller coupled to the higher band switch, a higher band bypass switch coupled to the higher band switch and to the higher band receive mixer, a higher band bypass controller coupled to the higher band bypass switch, a higher band duplex filter coupled to the higher band switch and the higher band bypass switch, a lower band receive mixer, a lower band transmit mixer, wherein at least two of the bands are non-contiguous, a lower band switch coupled to the lower band transmit mixer, a lower band controller coupled to the lower band switch, a lower band bypass switch coupled to the lower band switch and to the lower band receive mixer, a lower band bypass controller coupled to the lower band bypass switch and a lower band duplex filter coupled to the lower band switch and the lower band bypass switch.

In a fourteenth aspect of the disclosure, a method of multi-input multi-output asynchronous dual band time division duplexing in non-contiguous bands comprising changing the values of two or more of the three parameters from a time interval to the next time interval of same or different duration for each band (in the same or different way across bands) wherein the three parameters are the number of OFDM symbols per UL sub-frame, that per DL sub-frame, and that per frame (the combined UL sub-frame and DL sub-frame) and their values are fixed within the considered time interval before or after the occurrence of the change.

In a fifteenth aspect of the disclosure, a method of multi-input multi-output asynchronous dual band time division duplexing in non-contiguous bands comprising changing the values of two or more of the three parameters across any of the sub-frames within a time interval for each band (in the same or different way across bands) wherein the three parameters are the number of OFDM symbols per UL sub-frame, that per DL sub-frame, and that per frame (the combined UL sub-frame and DL sub-frame).

In a sixteenth aspect of the disclosure, a method of multi-input multi-output asynchronous dual band time division duplexing in non-contiguous bands comprising two types of changing where the first type is the changing described in and the second type is changing the values of the set of the changing parameters from a time interval to the next time interval of same or different duration.

In a seventeenth aspect of the disclosure, a method of multi-input multi-output asynchronous dual band time division duplexing in non-contiguous bands comprising receiving/estimating channel state information for an uplink and a downlink from an uplink pilot signal in each band.

In an eighteenth aspect of the disclosure, a method of multi-input multi-output asynchronous dual band time division duplexing in non-contiguous bands comprising setting a base station reference timeline based on a target coverage range or a user equipment at a cell edge and synchronizing a transmit timeline and a receive timeline of the user equipment having a propagation delay to the base station reference timeline.

DESCRIPTION OF EXAMPLE EMBODIMENTS

Massive multi-input multi-output (MIMO), also known as large-scale antenna system, offers substantial performance improvement in terms of spectral efficiency and energy efficiency. This spectral efficiency and energy efficiency comes at the expense of channel knowledge at the base station (BS). Currently, massive MIMO is not compatible with systems using frequency division duplexing (FDD) due to the large overhead to obtain channel state information (CSI) of user equipment (UE).

In practice, the available spectrum for a system is often non-contiguous, for example, two separate spectrum regions may be utilized for uplink and downlink. Thus, there is a practical need for enabling massive MIMO technology for frequency division duplexing (FDD) systems. Various embodiments of the disclosure may enable massive MIMO technology for FDD systems with reduced CSI overhead cost. Currently, FDD systems do not provide capacity adaptation between uplink (UL) and downlink (DL). Next generation systems may support several orders of magnitude higher data rate than current systems, and for that, capacity adaptation between UL and DL is sought due to traffic dynamics and traffic asymmetry of the links.

This disclosure presents potential examples to enable overhead-efficient massive multi-input multi-output in non-contiguous bands with frequency-selective channels. This disclosure also includes resource adaptation mechanisms between UL and DL which may also increase these spectrum efficiencies.

Spectrum allocations for non-contiguous bands currently have the UL and DL of a system operating in different bands, which is commonly known as FDD. However, as UL and DL CSI are different in FDD systems, acquiring individual DL CSI for massive MIMO operation may have large overhead. This overhead issue may present a limitation of massive MIMO in FDD mode.

Wireless systems generally possess asymmetric traffic in which DL data rates are higher than UL data rates and the traffic loads and asymmetry vary across time. Given varying UL and DL rates which may be time varying, using a fixed resource allocation between UL and DL may not yield efficient resource utilization and user support. One possible solution for time division duplexing (TDD) based wireless systems introduces resource adaptation between UL and DL by means of adjusting UL duration and DL duration, for example, with different UL and DL frame durations or with different numbers of UL and DL sub-frames of the same duration. Currently, in FDD-based systems, such resource adaptation is infeasible due to the permanent assignment of UL and DL bands.

The present disclosure is directed to MIMO in non-contiguous bands with frequency-selective channels and time-varying asymmetric traffic.

Three example system architectures are considered for massive MIMO systems. These architectures respectively utilize the concepts of the instant disclosure for rotating frequency division duplexing (RFDD), synchronous dual band time division duplexing (STDD) and asynchronous dual band TDD (ATDD).

In RFDD, the UL and DL bands are rotated after each transmission sub-frame providing CSI for UL and DL from the UL pilots.

STDD applies TDD to non-contiguous bands synchronously.

ATDD also uses TDD on multiple bands, utilizing a particular time offset, asynchronously, between the transmission frames of the bands. The time offset may be chosen to avoid simultaneous transmissions from the bands which overcomes the coverage range limitation of STDD under the peak power constraint.

Additionally, examples of resource adaptation for UL and DL with non-contiguous bands may overcome current issues with UL and DL traffic disparities and fluctuations. The proposed resource adaptation mechanisms may be applied to single antenna systems and non-massive MIMO systems which are allocated with non-contiguous bands.

System Description

Multi-cell massive MIMO system with two non-contiguous bands used as examples which are assumed to have a sufficient frequency separation between them to avoid interference. Extension to more than two non-contiguous bands is envisioned, to better illustrate the proposed architectures and concepts, two band examples are depicted. The paper "Massive MIMO Systems in Non-Contiguous Bands with Asymmetric Traffics" DOI 10.1109/TWC.2016.2544753, IEEE Transactions on Wireless Communications authored by Hlaing Minn and Amin Khansefid is included by reference in its entirety.

The carrier frequencies of the lower band and the higher band are denoted by $f_L$ and $f_H$. Orthogonal frequency division multiplexing (OFDM) transmission with a sub-carrier spacing of 1/T Hz and a cyclic prefix interval of $T_{CP}$ seconds for frequency-selective channels is considered as an example since other systems such as single carrier systems with frequency domain equalization can also be expressed by precoded OFDM.

The transmissions in the lower and higher bands may be respectively represented by individual OFDM systems with $N_1$ sub-carriers and $N_2$ sub-carriers having the same sub-carrier spacing, i.e., with bandwidths $N_1/T$ and $N_2/T$ Hz.

Base stations may have M antennas and cells may have K single-antenna user equipment. Base stations may utilize maximum ratio combining (MRC) receiver and maximum ratio transmission (MRT) and the transmitters may be peak power constrained.

Frames are considered having an UL sub-frame with duration $T_{UL}$, a receive-to-transmit guard interval $T_{RTG}$ (for circuit switching time to change from receive mode to transmit mode), a DL sub-frame with duration $T_{DL}$, and a transmit-to-receive guard interval $T_{TRG}$ (for two-way propagation and circuit switching time), or it may start with a DL sub-frame followed by $T_{TRG}$, an UL sub-frame, and $T_{RTG}$.

The frame length is generally determined by a latency, channel time variation level and frame overhead. Given a fixed frame duration, $T_{UL}$ and $T_{DL}$ may be changed for resource adaptation between uplink and downlink. Suppose the first sub-frame has $M_{sym1}$ OFDM symbols and the second sub-frame has $N_{sym2}$ OFDM symbols. Then, depending on the resource adaptation, $N_{sym1}$ and $N_{sym2}$ may be changed, while the sum $N_{sym1}+N_{sym2}=N_{sym}$ may be constant. In general, $N_{sym}$ may also be changed for the resource adaptation.

Quasi-static channels are considered in which channel gains remain the same within frames. For purposes of performance analysis, small-scale fading channels are assumed to be independent and identically distributed across BS antennas and across UE with $L_1$ and $L_2$ channel taps having Rayleigh envelopes in the lower and higher bands, respectively. The proposed approaches are applicable to other channel conditions. In the examples, L channel taps and N sub-carriers may be utilized without distinguishing between the lower and upper bands. For example, if the considered band may be the lower band, it implies that $L=L_1$ and $N=N_1$. For CSI acquisition, each of the K UEs in a cell may be assigned with one of the K orthogonal pilot signals. In UE with multiple antennas, independent channels may be viewed as single-antenna virtual UE. In correlated channels, an appropriate precoding may transform correlated channels into orthogonal channels, each of which may be treated as single-antenna virtual UE. If a pilot transmission is utilized at the beginning of an UL transmission, the same pilot set may be reused in other cells. The minimum pilot overhead is K $L_1$ tones for the lower band and K $L_2$ tones for the higher band.

Orthogonal pilot designs, which yield minimum overhead if $\log_2(L)$ is an integer, are utilized. If minimum pilot overhead is desired for the case where $\log_2(L)$ is not an integer, a pilot design with approximately equal pilot tone spacing may be used at a cost of marginal performance degradation. If K L>N, more than one OFDM symbol may be used for pilot transmission, and time division multiplexing (TDM) pilot design or code division multiplexing across time (CDM-T) pilot design may be applied. Within OFDM symbol carrying pilot, frequency division multiplexing (FDM) or code division multiplexing in frequency domain (CDM-F) pilot designs may be applied.

The statistics of the channel, channel estimate and channel estimation error may be the same across subcarriers. Due to the large number of base station antennas, after precoding/beam-forming, the relative fluctuations of the effective channel gains across the subcarriers may be substantially suppressed. Massive MIMO systems apply per-subcarrier processing. Under such a system setup, the signal model may be decoupled for the subcarrier. The channel for the subcarrier may be frequency-flat, and channel statistics per-subcarrier may be equivalent across subcarriers. Thus, the signal model may be the same across the subcarriers. Consequently, the achievable rate may be the same across subcarriers.

The UL received signal vector is given by Annex 1 of the above-mentioned application, page 41, equation (8) and the DL received signal is given by equation (10) of the same page.

Transceiver System Architectures

Three example transceiver system architectures for massive MIMO in non-contiguous bands will be described. The lower bound of the achievable rate expression on a subcarrier for UL transmission is given by Annex 1 of the above-mentioned application, page 43, equation (11) and the lower bound of the achievable rate on a subcarrier of DL is given by Annex 1 of the above-mentioned application, page 44, equation (12).

Rotating FDD (RFDD)

In this architecture, the UL band and the DL band are alternated in the transmission sub-frame, i.e., the carrier frequencies of the UL and DL bands are alternated or rotated between $f_L$ and $f_H$ before the beginning of each transmission sub-frame. The UL band in the current sub-frame becomes the DL band in the next sub-frame, so the CSI of the DL for the next sub-frame may be obtained from the pilots in the current UL sub-frame. This rotation may provide the CSI for massive MIMO in FDD.

The normalized throughput of an RFDD system for UL and DL are given in Annex 1 of the above-mentioned application, page 44, equations (13) and (14). The spectrum efficiency expression of each UL or DL is given by the achievable rate normalized by the resource amount of the considered individual link. If the guard time overhead cost is split equally between UL and DL, the spectrum efficiency expressions for the UL and DL of RFDD are given by Annex 1 of the above-mentioned application, page 45, equations (24) and (25).

FIG. 1 presents the system architecture for a transceiver with RFDD having adaptation/switching in the duplex filter and the frequency synthesizer. In this figure an adaptive duplex filter 110 is coupled to an antenna 124, a transmit in-phase and quadrature mixer 116, a receive in-phase and quadrature mixer 118 and a controller 112. A dual output adaptive frequency synthesizer 114 is coupled to the controller 112 and the mixers 116 and 118. The transmit in-phase and quadrature mixer 116 is coupled to the baseband transmit processor 120, and the receive in-phase and quadrature mixer 118 is coupled to the baseband receive processor 122.

Figure 2:
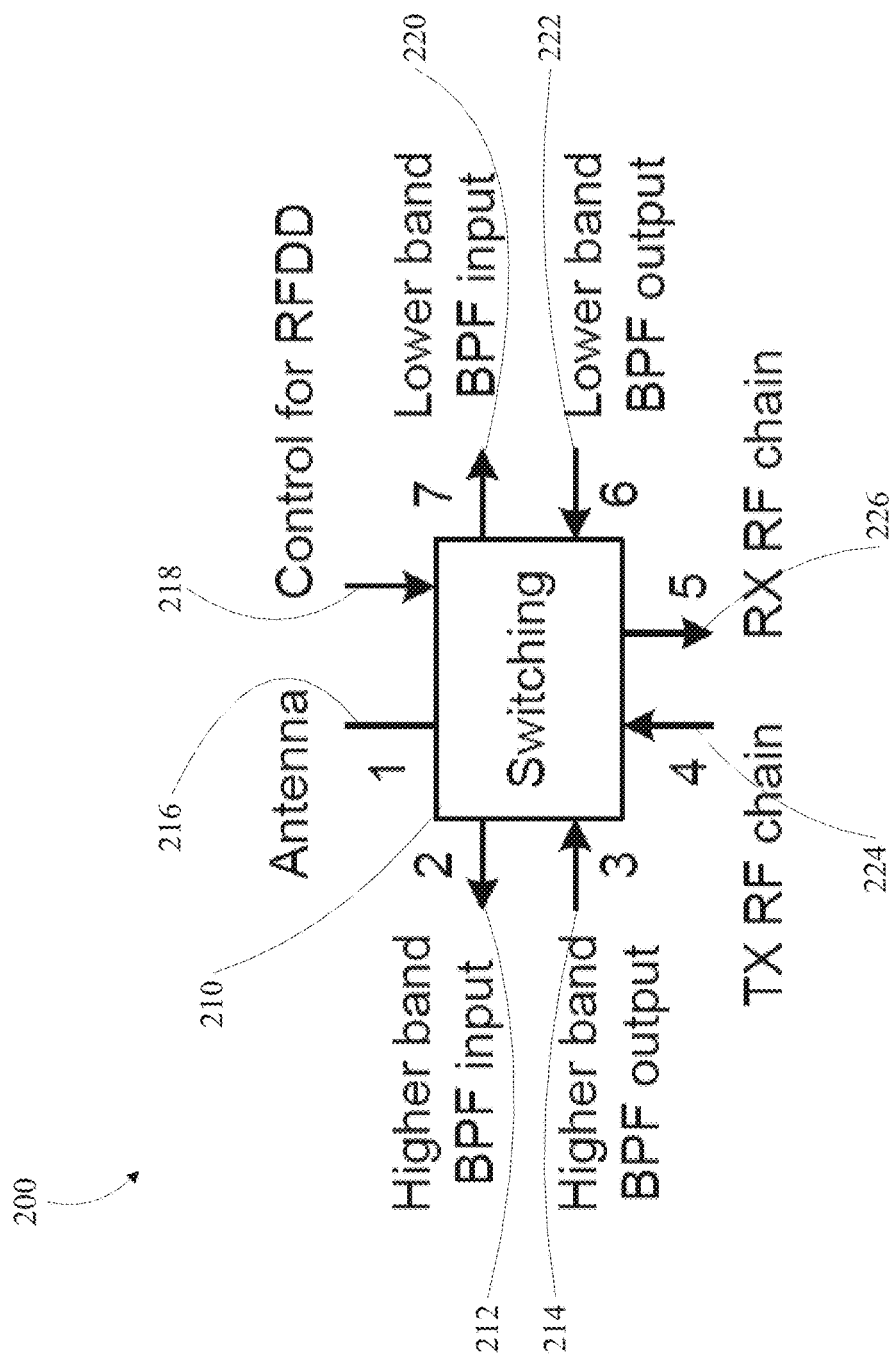
FIG. 2 depicts an adaptive duplex filter architecture example for RFDD in accordance with an embodiment of the disclosure.

FIG. 2 shows an example architecture for the adaptive duplex filter 200 which swaps the bandpass filters (BPFs) for transmit and receive signals through a switching circuit 210. It has two modes where mode 1 receives in the higher band and transmits in the lower band while mode 2 receives in the lower band and transmits in the higher band. The switching circuit 210 facilitates changing between the two modes at the beginning of every sub-frame as instructed by the control signal. In mode 1, 1-2, 3-5, 4-7 and 6-1 are coupled. In mode 2, 1-7, 6-5, 4-2 and 3-1 are coupled. In this example, the higher band BPF input is 212, the higher band BPF output is 214, the antenna is 216, the input from the controller output is 218, the lower band BPF input is 220, the lower band BPF output is 222, the input from the transmit circuitry output is 224 and the output to the input of the receive circuitry is 226.

Figure 3:
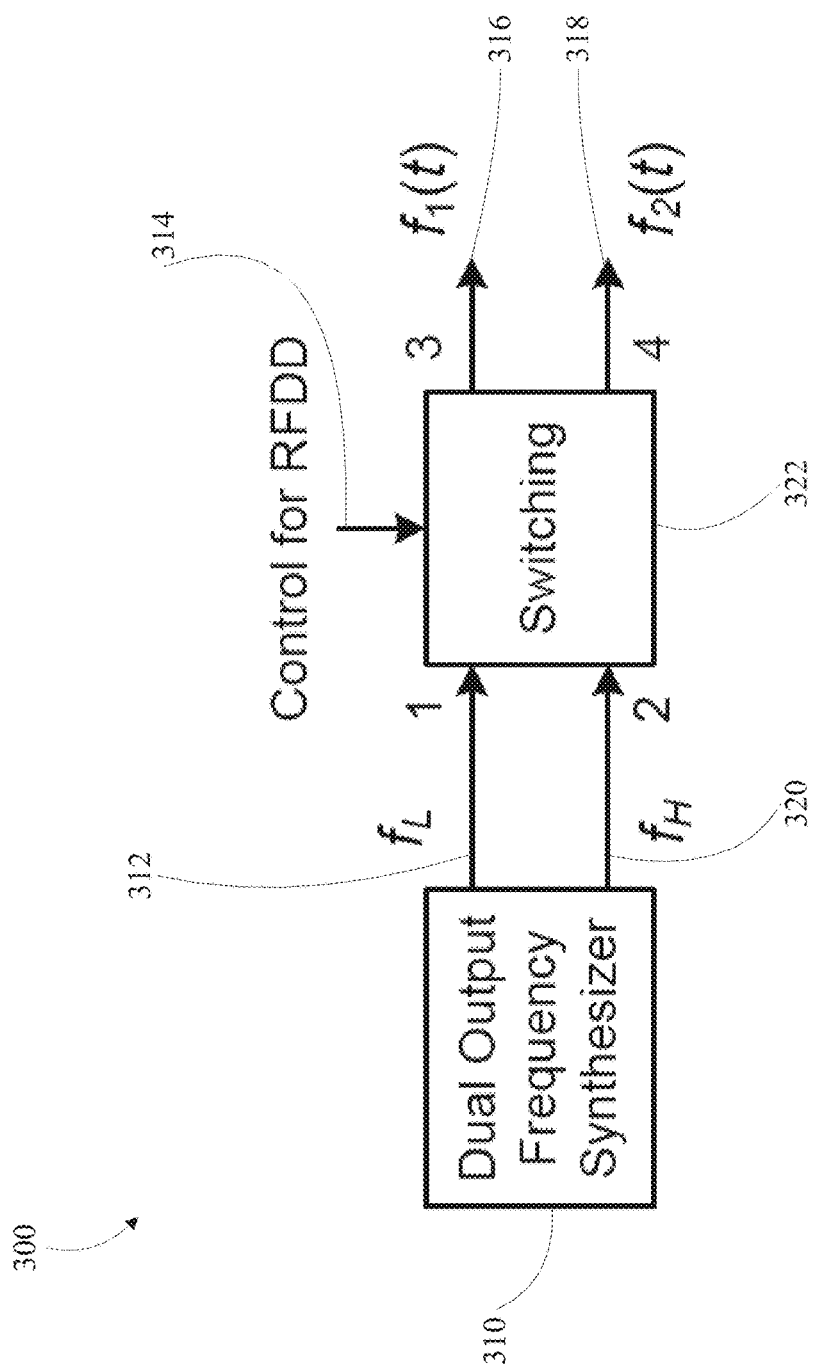
FIG. 3 depicts an adaptive frequency synthesizer example for RFDD in accordance with an embodiment of the disclosure.

An adaptive frequency synthesizer for RFDD is illustrated in FIG. 3 where the transmit carrier frequency $f_1(t)$ 316 and the receive carrier frequency $f_2(t)$ 318 are generated by a simple switching circuit 322 and a dual output frequency synthesizer 310 having a higher band frequency $f_H$ 320 and a lower band frequency $f_L$ 312 input into a switch 322 having an input from the controller output 314.

Figure 4:
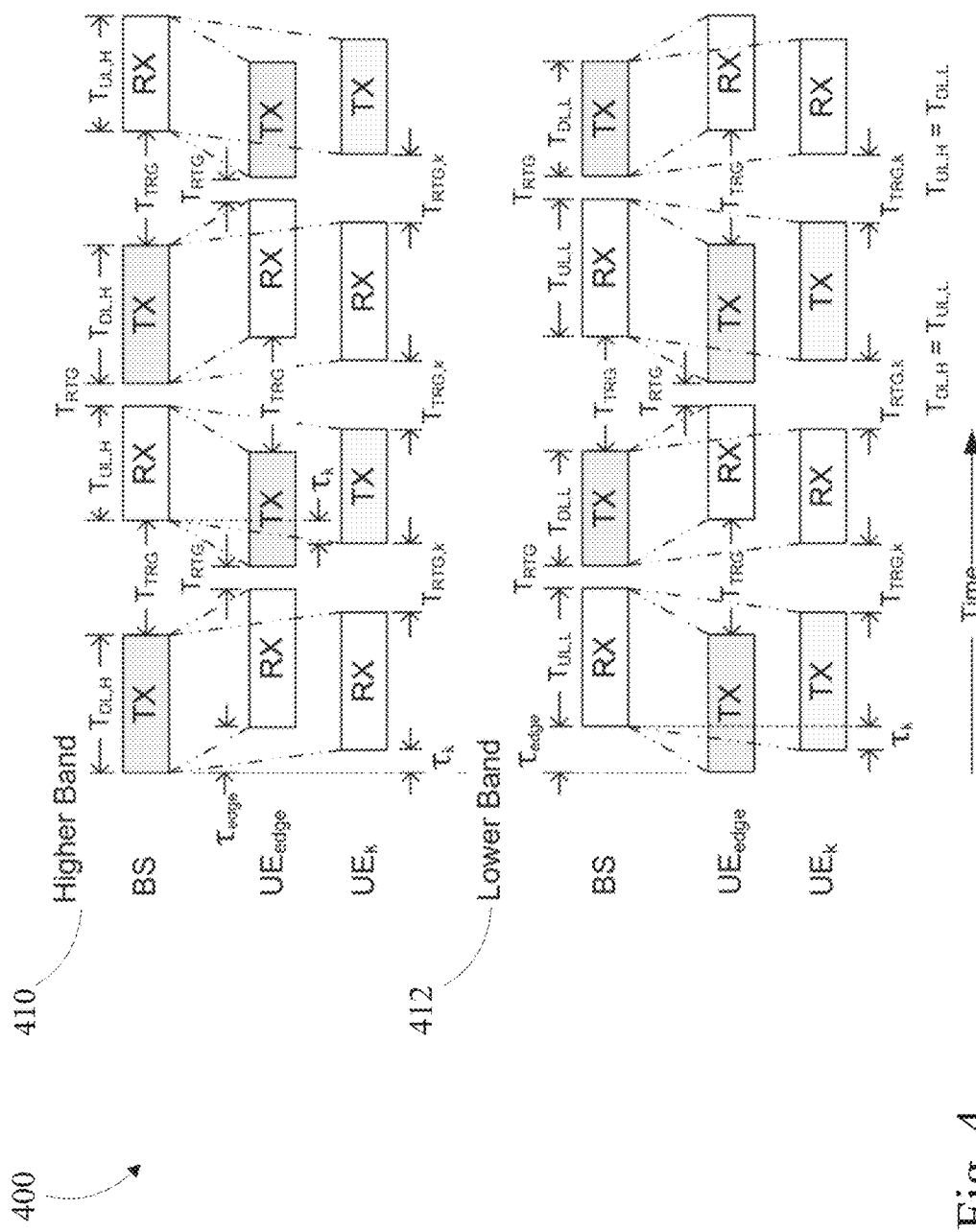
FIG. 4 depicts an example frame timeline for RFDD in accordance with an embodiment of the disclosure.

The transmit and receive timelines of RFDD in the two bands are shown in FIG. 4 for BS and UE. The BS timeline serves as the reference and is based on the target coverage range or a UE at the cell edge (UEedge), while UE k with a propagation delay adjusts its transmit and receive timelines through synchronization to conform to the BS reference timeline. $T_{UL,H}$ and $T_{DL,H}$ represent the frame lengths of UL and DL in the higher band, and $T_{UL,L}$ and $T_{DL,L}$ are those in the lower band. For RFDD, $T_{DL,H}=T_{UL,L}$ and $T_{UL,H}=T_{DL,L}$ so that the transmissions from the two bands do not overlap and there is some guard interval for switching the bands. The higher band 410 and the lower band 412 are non-contiguous in this example.

Synchronous Dual Band TDD (STDD)

Figure 5:
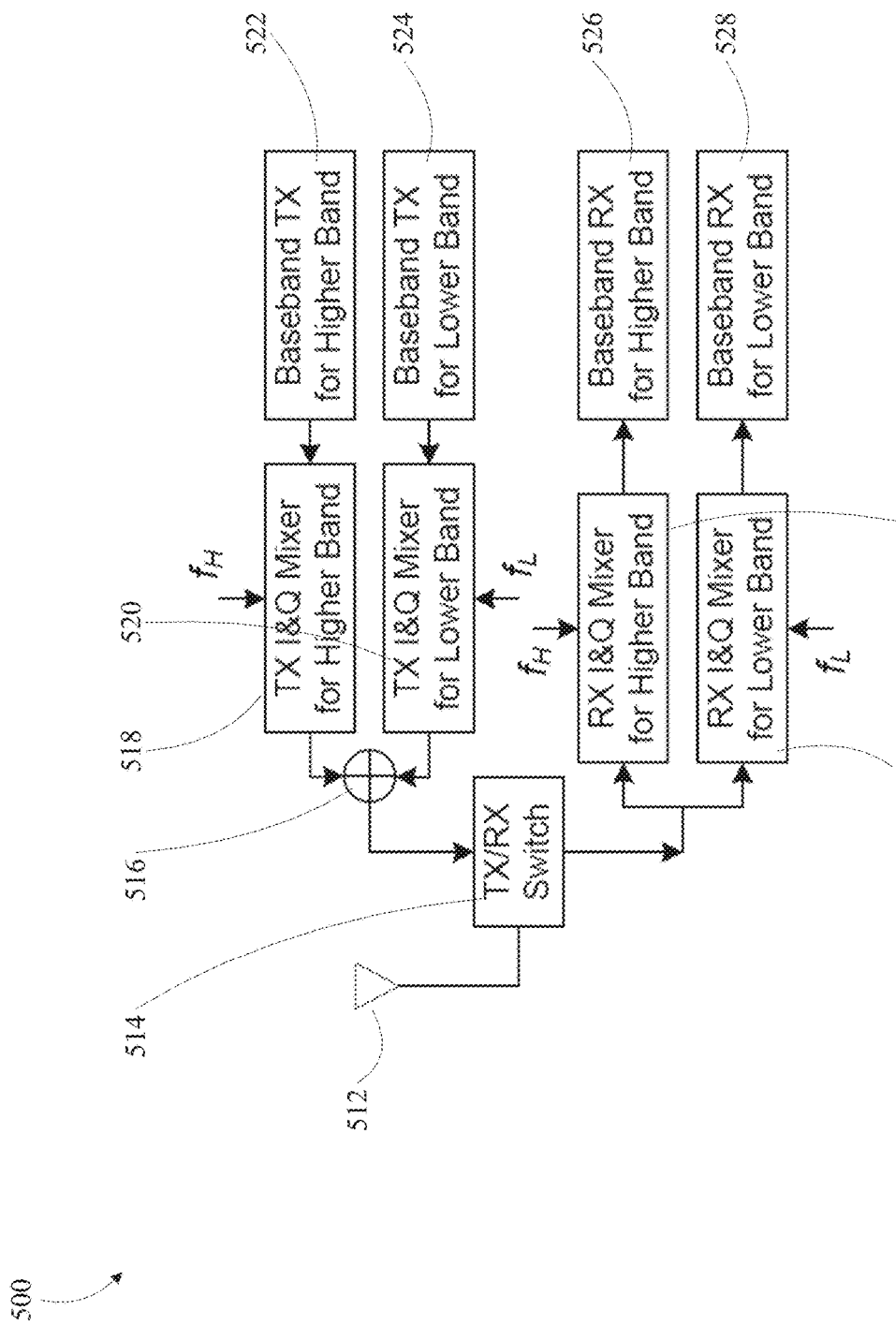
FIG. 5 depicts a transceiver system architecture example for synchronous dual band time division duplexing (STDD) in accordance with an embodiment of the disclosure.

STDD applies TDD for bands synchronously. The corresponding architecture is shown in FIG. 5 where the two carrier frequencies $f_L$ and $f_H$ are generated by a dual output frequency synthesizer.

The normalized throughputs of an STDD system for UL and DL are given in Annex 1 of the above-mentioned application, page 44, equations (15) and (16). The spectrum efficiency expression of each UL or DL is given by the achievable rate normalized by the resource amount of the considered individual link. If the guard time overhead cost is split equally between UL and DL, the spectrum efficiency expressions for the UL and DL of STDD are given by Annex 1 of the above-mentioned application, page 45, equations (26) and (27).

The MIMO STDD transceiver 500 comprises a higher band transmit mixer 518, a lower band transmit mixer 520, an adder 516 coupled to the higher band transmit mixer and the lower band transmit mixer. The transceiver also comprises a higher band receive mixer 532, a lower band receive mixer 530 and a switch 514 coupled to the adder and the higher band receive mixer and the lower band receive mixer. Baseband transmit processors 522 and 524 and baseband receive processors 526 and 528 are coupled to their respective mixers.

Figure 6:
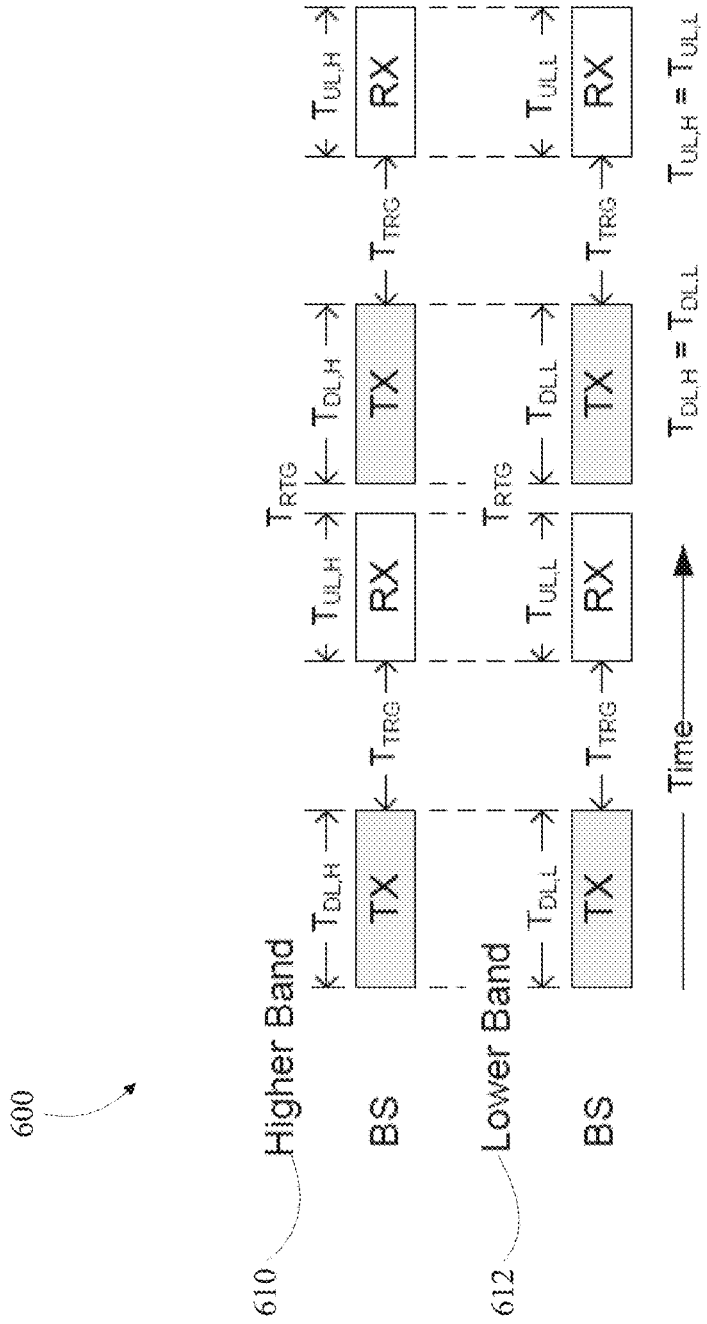
FIG. 6 depicts an example frame timeline for STDD in accordance with an embodiment of the disclosure.

The BS reference timelines are shown in FIG. 6 where $T_{DL,H}=T_{DL,L}$ and $T_{UL,H}=T_{UL,L}$ for synchronous operation between the two bands. The receive branch may have a dual-band band-pass filter to filter out other signals. Due to TDD, CSI for UL and DL may be obtained from UL pilots. The peak transmit power may be shared between the two bands.

Asynchronous Dual Band TDD (ATDD)

Figure 7:
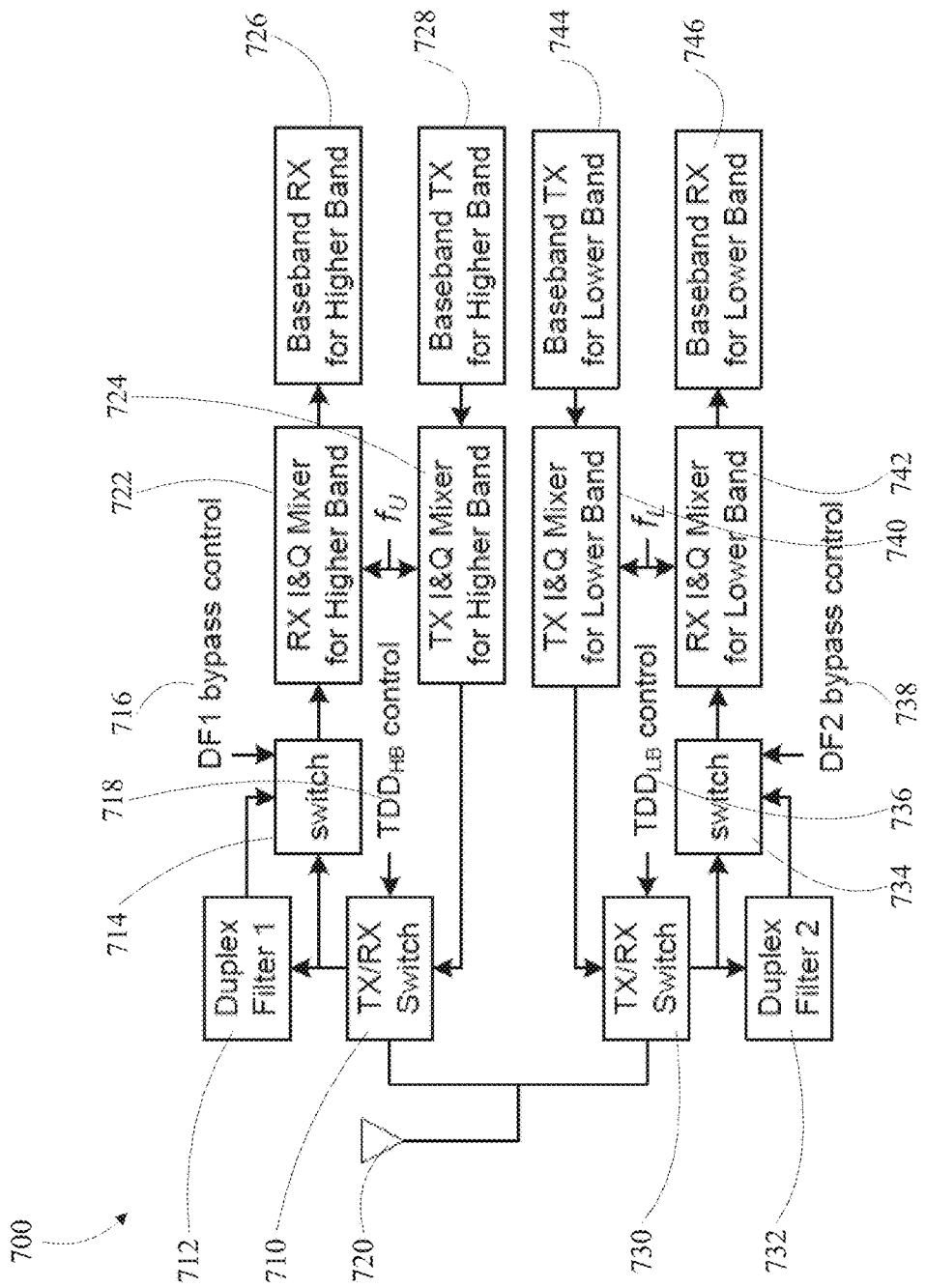
FIG. 7 depicts a transceiver system architecture for asynchronous dual band time division duplexing (ATDD) in accordance with an embodiment of the disclosure.

ATDD allows asynchronous TDD transmissions on the two bands, and an architecture for ATDD is shown in FIG. 7. The CSI for massive MIMO is obtained in the same way as in STDD. As the TDD transmissions of the two bands may not be synchronous, depending on the setting of the transmission timeline of the two bands, there may be overlap of one band's transmit interval with the other band's receive interval for a transceiver. For such a situation, a duplex filter may be added for the receiving band to suppress the transmit signal of the other band. There can also be time-overlap of transmissions from the two bands during which coverage range or data rate would be reduced under the peak transmit power constraint.

The normalized throughput of an ATDD system for UL and DL are given in Annex 1 of the above-mentioned application, page 45, equations (18) and (19). The spectrum efficiency expression of each UL or DL is given by the achievable rate normalized by the resource amount of the considered individual link. If the guard time overhead cost is split equally between UL and DL, the spectrum efficiency expressions for the UL and DL of ATDD are given by Annex 1 of the above-mentioned application, page 45, equations (28) and (29).

Figure 8:
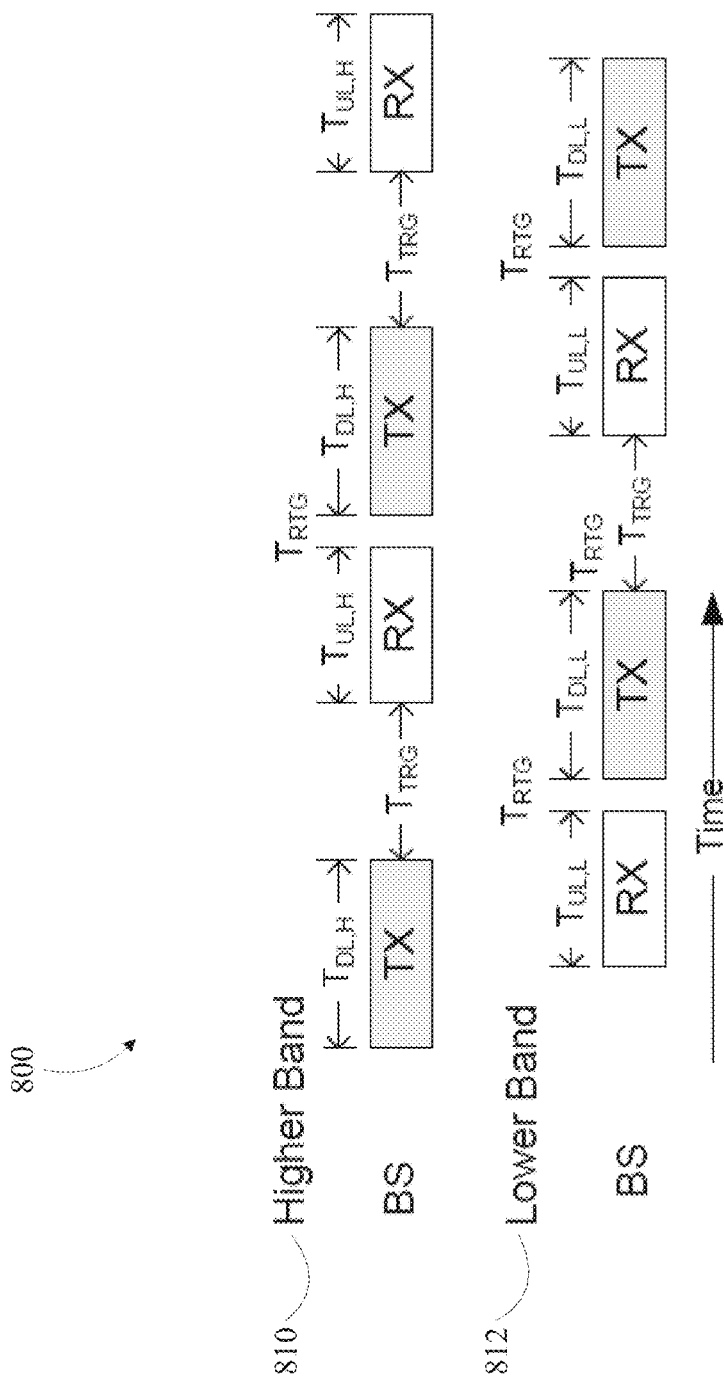
FIG. 8 depicts an example frame timeline for ATDD in accordance with an embodiment of the disclosure.

ATDD's transmission timeline may be set as in STDD without a duplex filter, as in RFDD without affecting rate under peak power constraints, or between them depending on system requirements. An example of the BS reference timeline without overlapped transmissions such as overcoming the peak power constraint issue of synchronous architecture is shown in FIG. 8, for which duplex filters are used.

The architecture in FIG. 7 is developed with adaptability for various scenarios in mind, thus it includes switches to bypass duplex filters in order to avoid unnecessary insertion loss. The MIMO ATDD transceiver 700 comprises a higher band receive mixer 722, a higher band transmit mixer 724 and a higher band switch 710 coupled to the higher band transmit mixer 724. The transceiver also comprises a higher band controller 718 coupled to the higher band switch 710, a higher band bypass switch 714 coupled to the higher band switch 710 and to the higher band receive mixer 722. The transceiver further comprises a higher band bypass controller 716 coupled to the higher band bypass switch 714, a higher band duplex filter 712 coupled to the higher band switch 710 and the higher band bypass switch 714. For the lower bands the transceiver further comprises a lower band receive mixer 742, a lower band transmit mixer 740, wherein at least two of the bands are non-contiguous, a lower band switch 730 coupled to the lower band transmit mixer 740 and a lower band controller 736 coupled to the lower band switch 730. The transceiver also comprises a lower band bypass switch 734 coupled to the lower band switch 730 and to the lower band receive mixer 742, a lower band bypass controller 738 coupled to the lower band bypass switch 734, and a lower band duplex filter 732 coupled to the lower band switch 730 and the lower band bypass switch 734.

Resource Adaptation Between Uplink and Downlink

The instant disclosure describes resource adaptation between UL and DL. UL and DL traffic loads in practice may be asymmetric and time varying. For systems with non-contiguous bands, FDD is conventionally applied but no resource adaptation mechanism is currently available. For our proposed schemes, the UL and DL throughputs depend on the numbers of OFDM symbols in the UL and DL subframes, i.e., $N_{sym1}$ and $N_{sym2}=N_{sym}-N_{sym1}$. Thus, the adaptation may be accomplished by changing them. In general, the resource adaptation may be done by changing two or more of the three parameters $N_{sym1}$, $N_{sym2}$, and $N_{sym}$.

For RFDD, the time-frequency resource amounts, numbers of tones across time and frequency, allocated to UL and DL, respectively are denoted by $\rho^{u,RFDD}$ and $\rho^{d,RFDD}$, are given by $\rho^{u,RFDD}=N_{sym1} N_1+N_{sym2} N_2$ and $\rho^{d,RFDD}=N_{sym} N_1+N_{sym1}(N_2-N_1)$.

RFDD may perform resource adaptation between UL and DL if $N_1$ and $N_2$ are different or if the two bands have different bandwidths.

Under a fixed $N_{sym}$, RFDD and STDD have one parameter $N_{sym1}$ to adjust for resource adaptation, while ATDD has two parameters $N_{sym,L1}$ and $N_{sym,H1}$ for adjustment. In general, the parameters for adaptation are $(N_{sym1}, N_{sym})$ for RFDD and STDD, and $(N_{sym,L1}, N_{sym,H1}, N_{sym})$ for ATDD. Thus, ATDD exhibits more flexible resource adaptation than the other two. If the system has a peak transmit power constraints, the ATDD's adaptation may avoid some of the resource allocation settings which suffer substantial rate loss due to the transmit power sharing between simultaneous transmissions.

As the adjustment parameters are discrete integers, there are finite numbers of possible operation points in resource adaptation. Under a fixed $N_{sym}$, for RFDD and ATDD, there are $N_{sym}-1$ operation points. For ATDD, by determining the number of integer parameter pairs $(N_{sym,H1}, N_{sym,L2})$ satisfying the condition $1 \leq N_{sym,H1} \leq N_{sym,L2} \leq N-1$, $0.5 N_{sym}(N_{sym}-1)$ operation points are obtained. The ATDD adaptation may exclude points with substantial rate loss incurred by simultaneous transmissions.

The bandwidths of the two bands (represented by $N_1$ and $N_2$) may also influence the operation points or range of the resource adaptation.

The time-frequency resource amounts allocated to UL and DL for RFDD are given by Annex 1 of the above-mentioned application, page 46, equations (30) and (31), for STDD equations (32) and (33) are shown on page 46 and for ATDD equations (34) and (35) are also shown on page 46 of Annex 1 of the above-mentioned application.

If a finer granularity in resource adaptation is desired, one possible solution may be to adjust two or more of the three parameters ($N_{sym1}$, $N_{sym2}$, $N_{sym}$ in each band for RFDD and STDD; $N_{sym,L1}$, $N_{sym,L2}$, $N_{sym}$ in the lower band and $N_{sym,H1}$, $N_{sym,H2}$, $N_{sym}$ in the higher band for ATDD) over successive frames. For example, for RFDD with finer granularity over two successive frames with a fixed $N_{sym}$, equation (36) of Annex 1 of the above-mentioned application, page 46 may be used, for V frames with a fixed $N_{sym}$, equation (37) of the same page may be utilized.

In multi-cell environments, to prevent intercell interference, adjacent cells may adopt the same resource adaptation between UL and DL as determined by a mobile switching center which those cells are connected to. Such resource adaptation is performed based on medium-term traffic statistics, and as such comprised a much larger time scale than other channel adaptation such as adaptive modulation, thus its signaling requirement would be less frequent.

The resource adaptation capability of RFDD, STDD, and ATDD are shown in FIG. 9-13. The effects of the frame length ($N_{sym}$) and the bandwidths of the two bands ($N_1$ and $N_2$) on the resource adaptation capability are illustrated. In these examples E=30 dB and M=60 base station antennas. The adaptation is done through $N_{sym1}$ for RFDD and STDD, and through $N_{sym,L1}$ and $N_{sym,H1}$ for ATDD. The frame timeline of ATDD was set to avoid UL transmission overlap.

Figure 9:
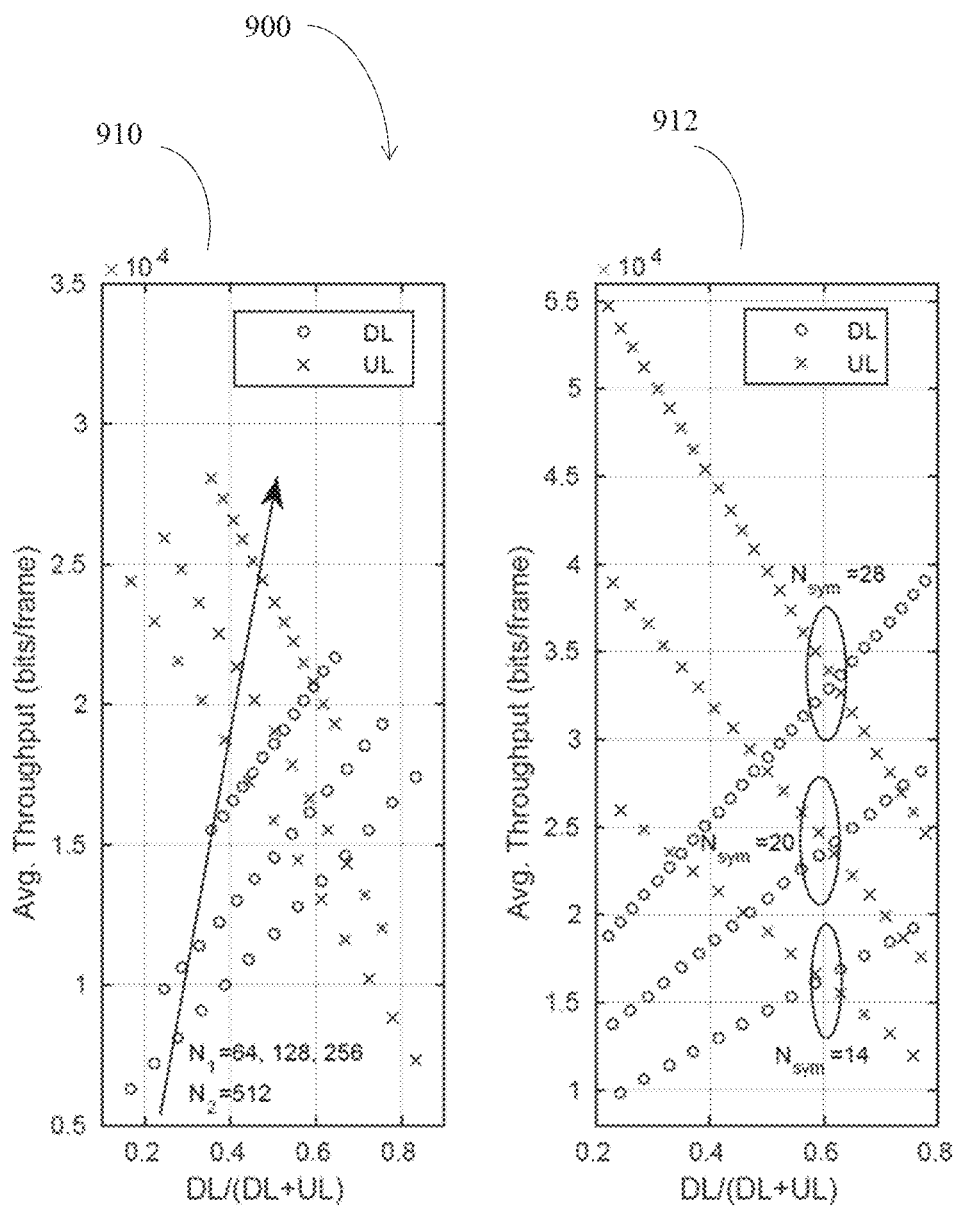
FIG. 9 depicts an example effect of bandwidth and frame length on the resource adaptation of RFDD in accordance with an embodiment of the disclosure.
Figure 10:
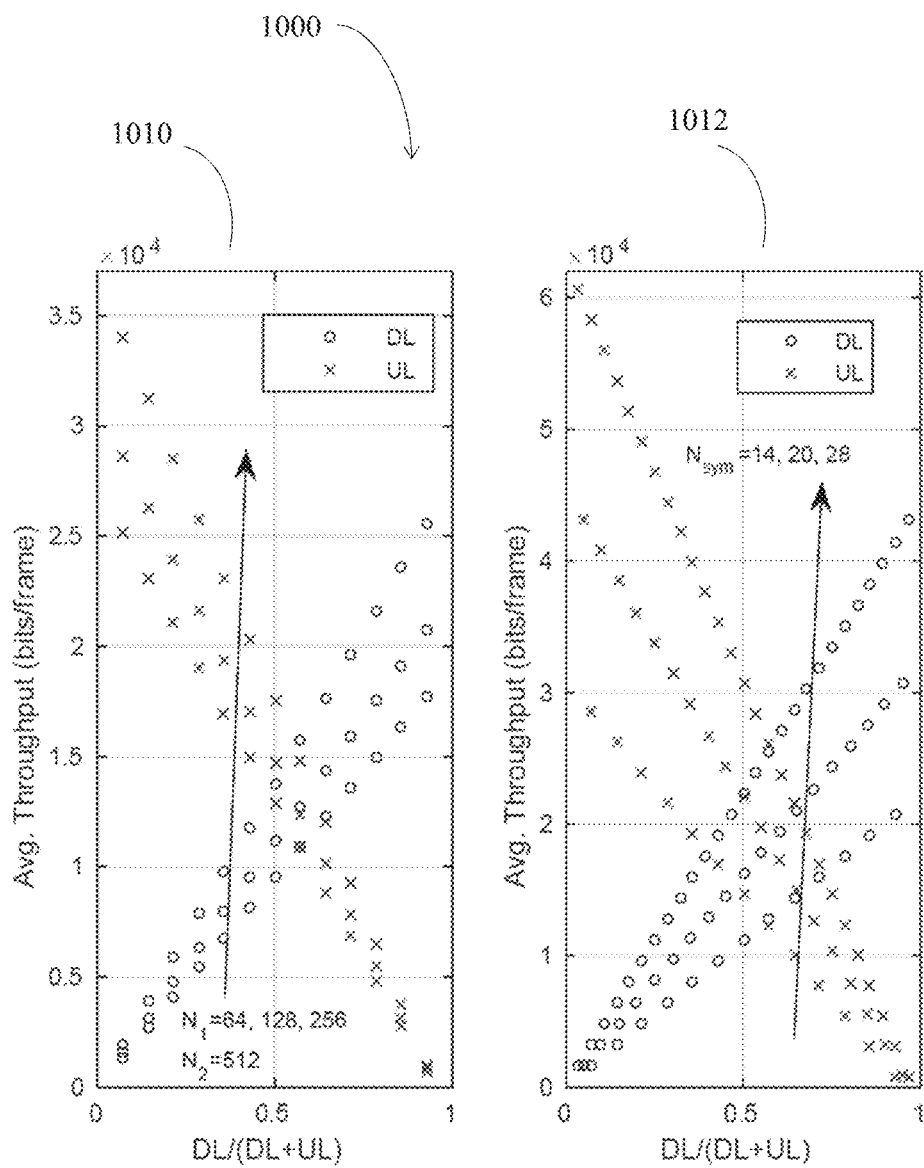
FIG. 10 depicts an example effect of bandwidth and frame length on the resource adaptation of STDD in accordance with an embodiment of the disclosure.
Figure 11:
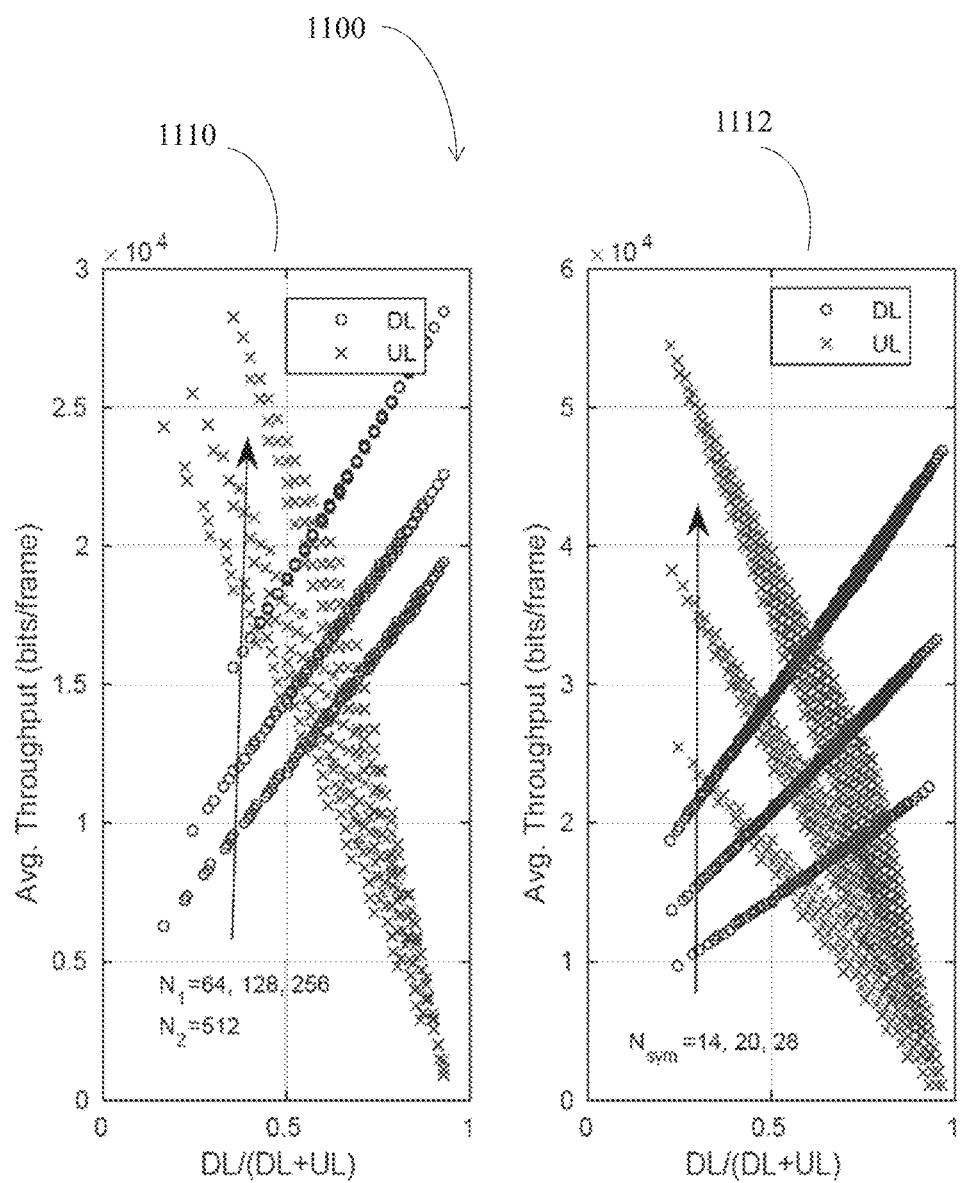
FIG. 11 depicts an example effect of bandwidth and frame length on the resource adaptation of ATDD in accordance with an embodiment of the disclosure.

The throughputs per sub-frame versus the allowable normalized downlink resource amount are shown in FIG. 9, FIG. 10, and FIG. 11 for RFDD, STDD, and ATDD, respectively. The left sub-plots show effects of changing the number of subcarriers with $N_{sym}$=14. The right sub-plots present effects of changing $N_{sym}$ with $N_1$=128, $N_2$=512 subcarriers and $L_1$=8, $L_2$=32 channel taps.

Different bandwidth ratios ($N_1/N_2$) do not affect the operation points and range of adaptation of STDD, but they do influence those of RFDD and ATDD. The smaller ratio of the smaller to the larger bandwidth offers a wider resource adaptation range for RFDD and ATDD.

A larger number of OFDM symbols per frame does not affect the adaptation range but it may improve the resolution of resource adaptation in the examples.

ATDD's performance curves show slight dispersion. This may be caused by the normalized rates which may be quite different for the two bands due to their different channel estimation performances, and the adaptation may be done by changing the UL subframe length of the lower band ($N_{sym,L1}$), of the higher band ($N_{sym,H1}$) or the lower band and the higher band. In bands with different bandwidths, the gradual increases of the resource amount ratio between DL and DL+UL (x-axis in the figure) correspond to different combinations of $N_{sym,L1}$ and $N_{sym,H1}$ which together with the different normalized rates of the bands may result in slight dispersion of the rate curves.

Figure 12:
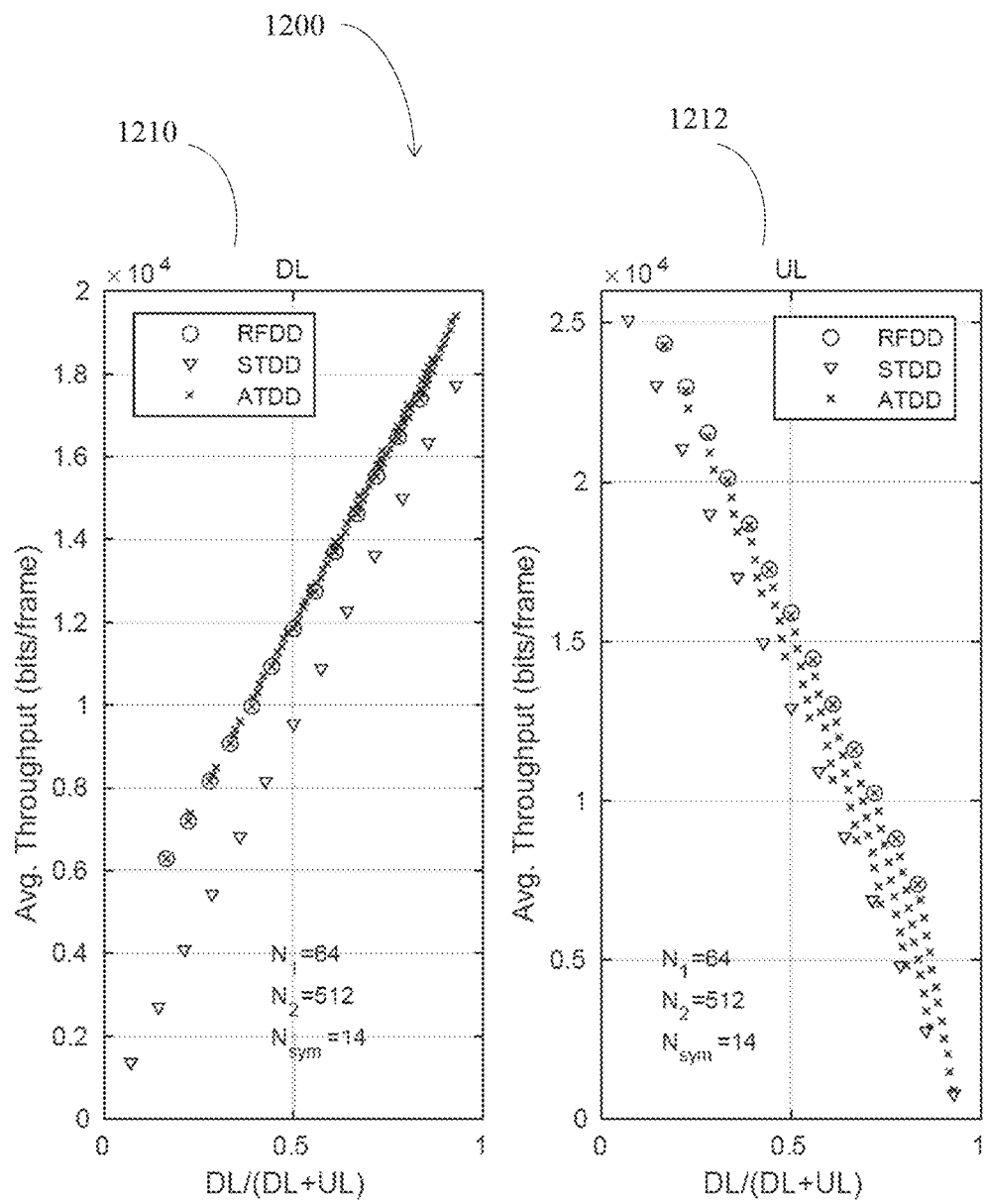
FIG. 12 depicts an example of available resource allocation settings and their uplink (UL) and downlink (DL) performances for RFDD, STDD, and ATDD schemes in accordance with an embodiment of the disclosure.

FIG. 12 compares the performance and adaptability of RFDD, STDD and ATDD. It may be seen that ATDD provides more adaption points but STDD has the widest adaptation range. The average throughputs of ATDD and RFDD are higher than that of STDD.

Figure 13:
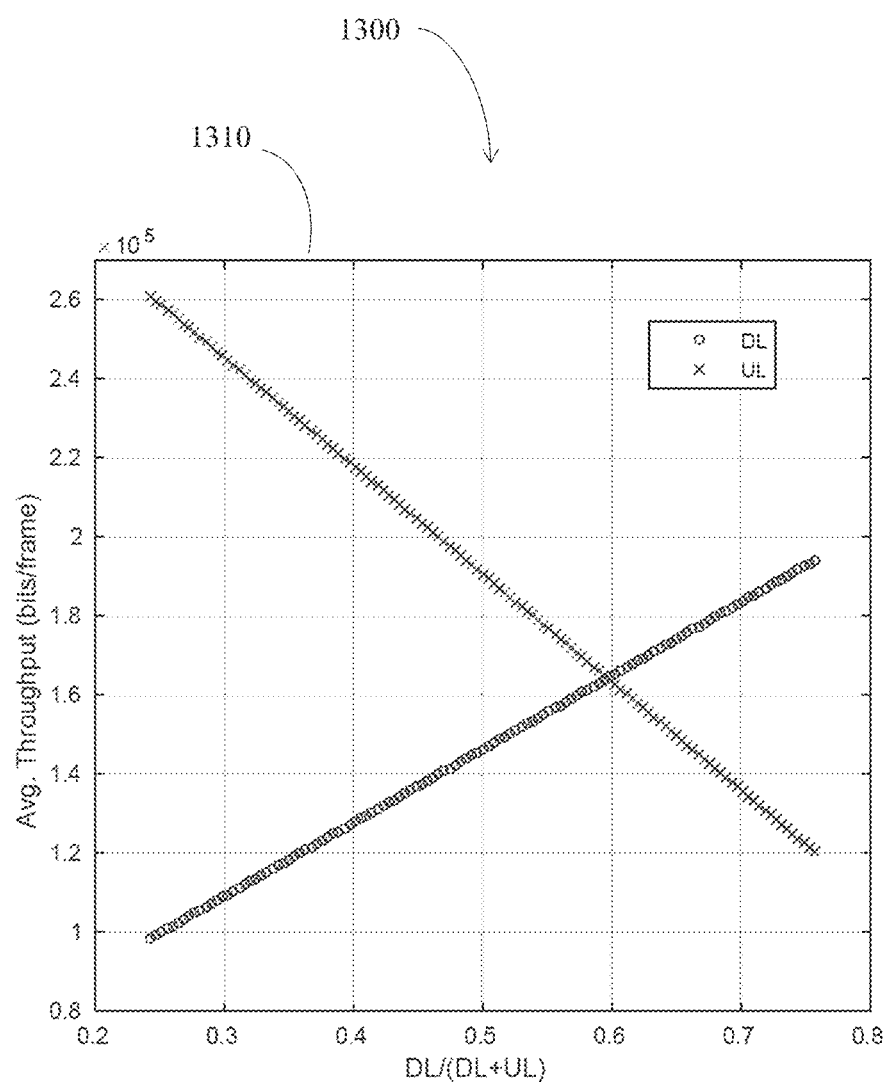
FIG. 13 depicts an example of available resource adaptation settings and their UL and DL performances for RFDD with resource adaptation granularity enhancement in accordance with an embodiment of the disclosure.

FIG. 13 illustrates further enhancement of resource adaptation granularity by means of changing the value of $N_{sym1}$ within 10 consecutive frames under the same frame length $N_{sym}$. The approach may be applied to RFDD, STDD, and ATDD examples, but RFDD with $N_1$=128 and $N_2$=512 was utilized as an example. By comparing FIG. 13 and the corresponding case in FIG. 12, this approach yields a very fine granularity of resource adaptation.

The performance of resource adaptation in multicell environments is depicted next. The same total resource amount is used for RFDD and FDD, with $N_{sym}$=14 and $N_1$+$N_2$=1000. Three traffic scenarios are considered where the average DL resource amount is 2, 5, and 10 times the average UL resource amount. For each traffic scenario, the actual requested resource amounts for UL and DL for different cells are modeled to be independent and identically distributed as Gaussian random variables, each with the mean value defined by the corresponding average resource amount allocated to the considered link and the variance defined by 10% of the mean value. The users in the cell have the same ratio of UL and DL requested resource amounts and the transmit power on the subcarrier is set to 30 dB.

For FDD settings, $N_1$ and $N_2$ for FDD are designed to match to the ratio of average traffics between DL and UL of the three scenarios (i.e., three different bandwidth allocations between the two bands). RFDD uses one setting of bandwidth allocation between DL and UL and three settings of sub-frame length adaptation based on the ratio of average traffics between DL and UL. The RFDD adaptation may be the same across cells and is managed by the mobile switching center.

Figure 14:
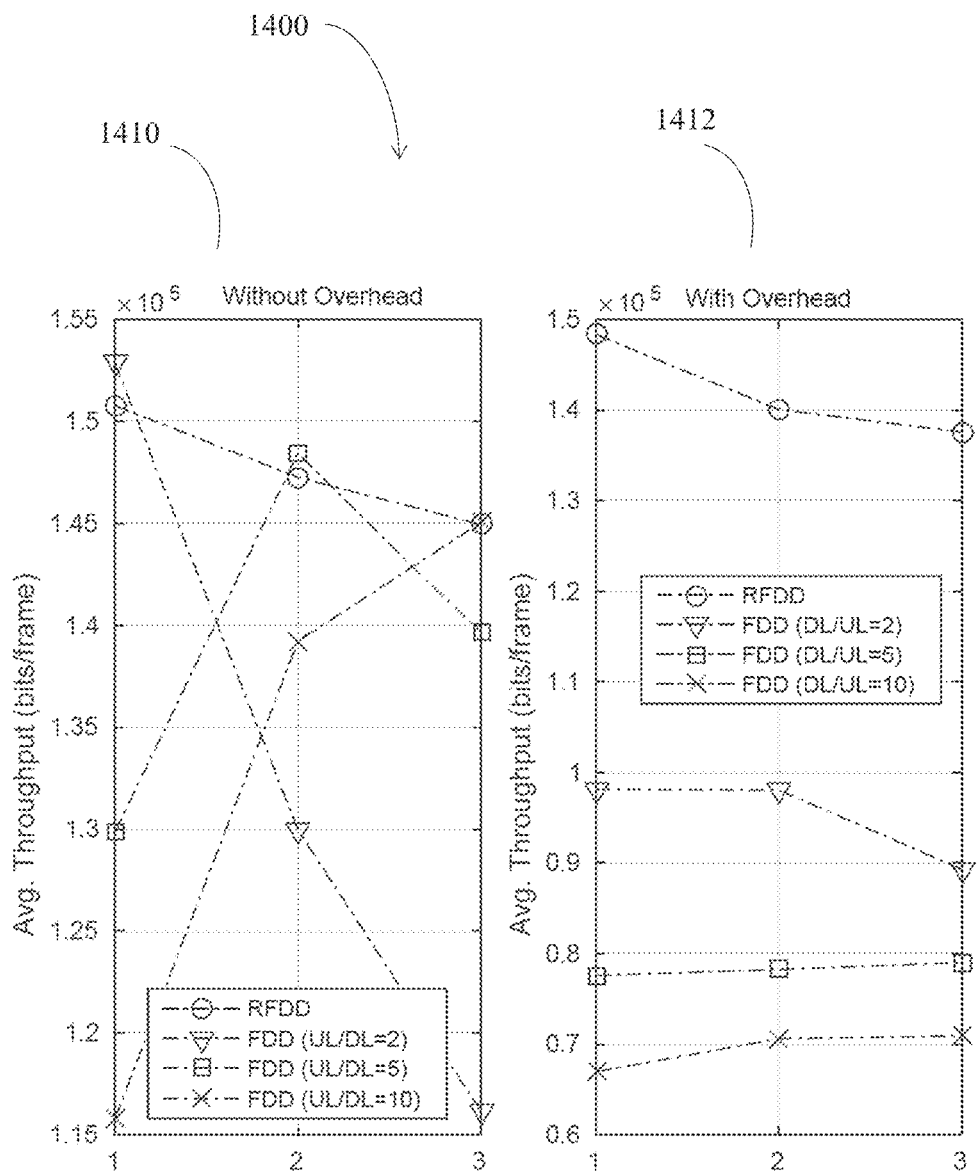
FIG. 14 depicts an example resource adaptation performance in multi-cell environments in accordance with an embodiment of the disclosure.

FIG. 14 compares the throughput performance of three FDD examples for the three settings and RFDD in multicell environments with the three traffic scenarios. The results are obtained from 10,000 realizations of random large scale fading coefficients and 1000 realizations of DL and UL resource requests. In the case CSI overhead cost is disregarded, the FDD examples perform well only when their spectrum allocation matches the traffic scenario, but RFDD performs approximately the same as the best of the three FDD examples. This illustrates the advantage of the disclosed resource adaptation in multicell environments. When CSI overhead cost is included, RFDD performance is slightly reduced but FDD schemes suffer substantial performance loss.

Figure 15:
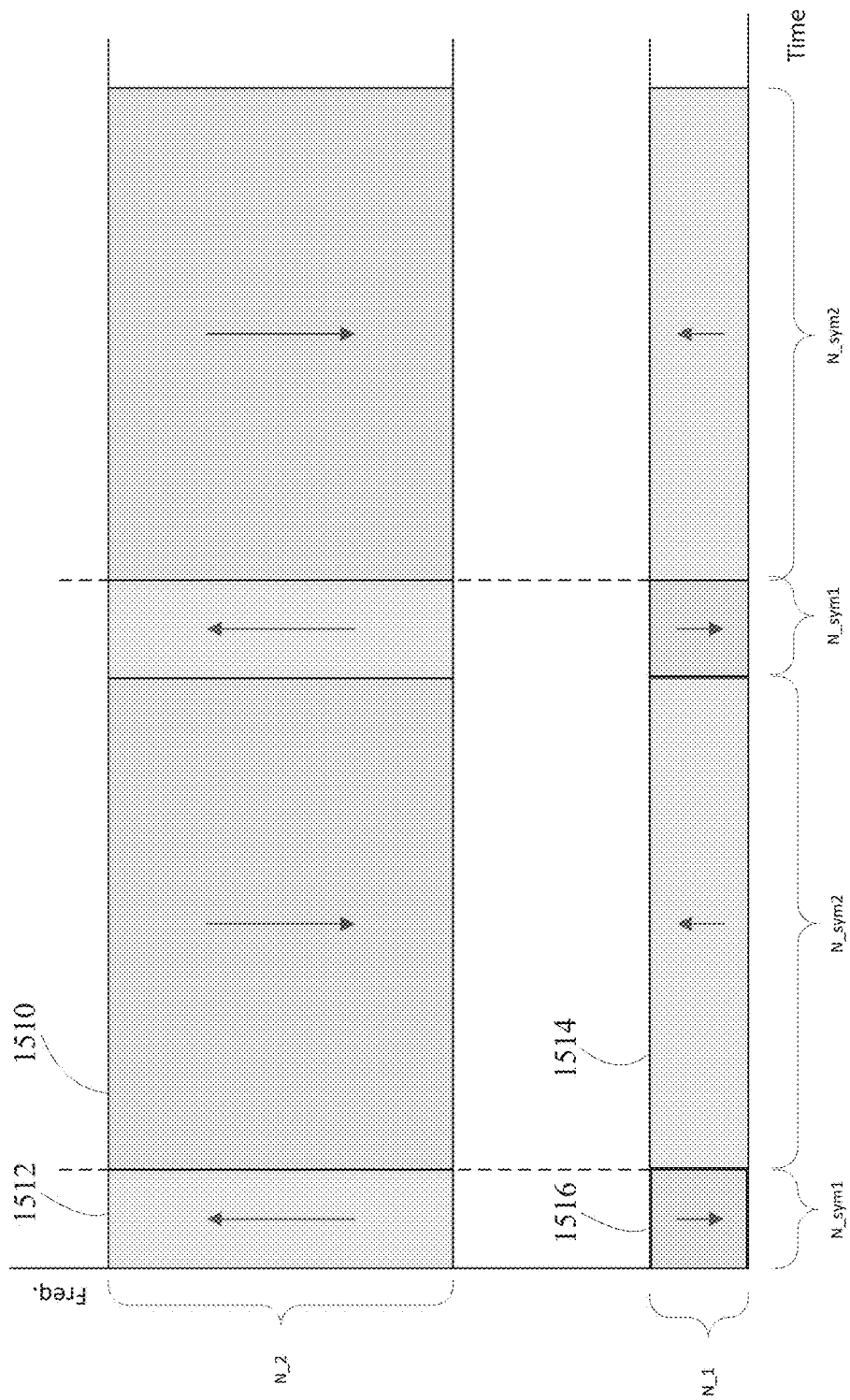
FIG. 15 depicts an example resource allocation having a higher DL resource amount than UL resource amount for RFDD in accordance with an embodiment of the disclosure.

FIG. 15 depicts an example resource allocation having a higher DL resource amount 1510 plus 1516 than UL resource amount 1512 plus 1514 for RFDD.

Figure 16:
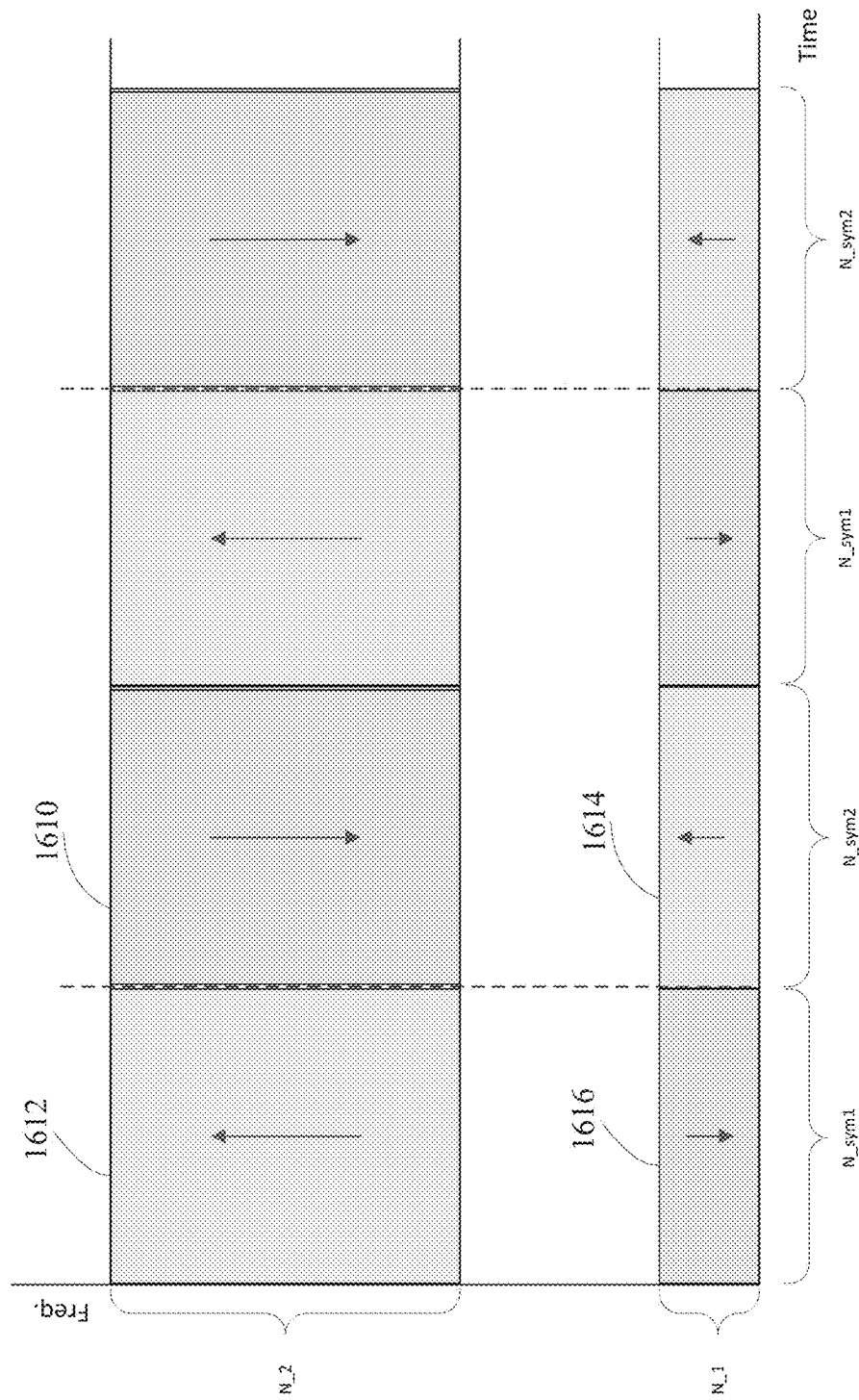
FIG. 16 depicts an example resource allocation having equal DL and UL resource amounts for RFDD in accordance with an embodiment of the disclosure.

FIG. 16 depicts an example resource allocation having equal resource amounts between DL 1610 plus 1616 and UL 1612 plus 1614 for RFDD.

Figure 17:
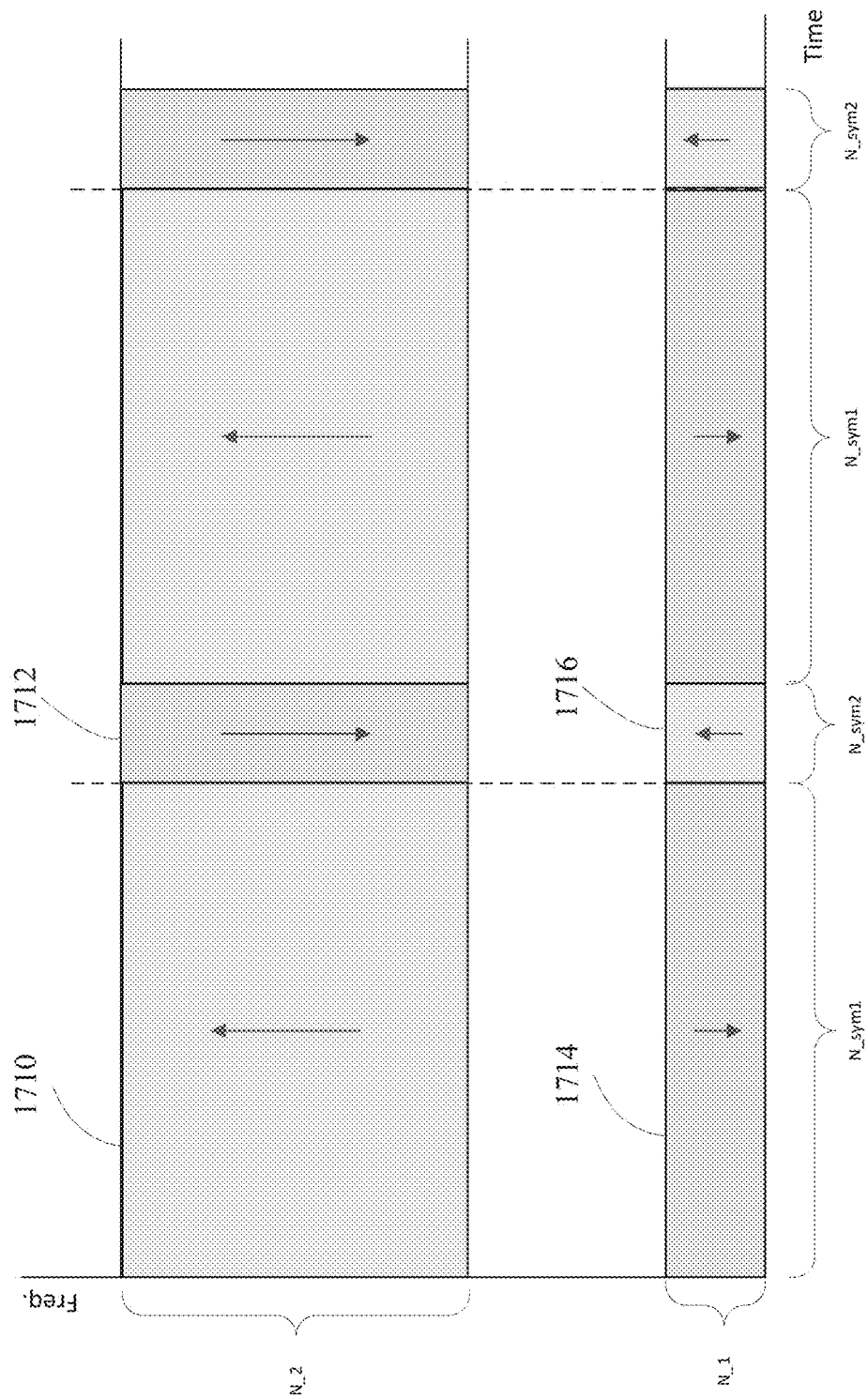
FIG. 17 depicts an example resource allocation having a higher UL resource amount than DL resource amount for RFDD in accordance with an embodiment of the disclosure.

FIG. 17 depicts an example resource allocation having a higher UL resource amount 1710 plus 1716 than DL resource amount 1712 plus 1714 for RFDD.

Figure 18:
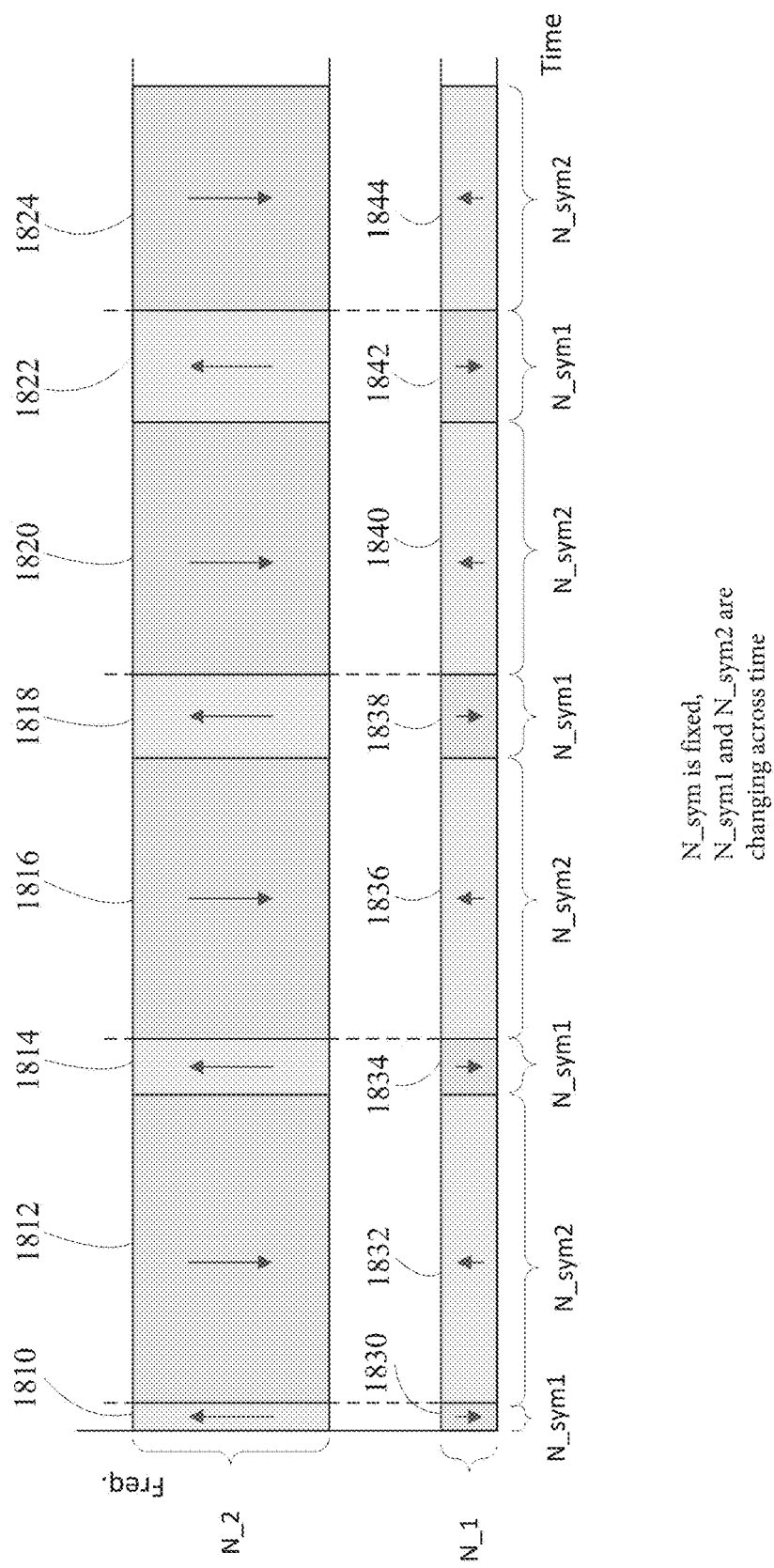
FIG. 18 depicts an example of fine resolution resource allocation between UL and DL for RFDD (where Nsym1 and Nsym2 individually do not remain the same across time but Nsym remains the same) in accordance with an embodiment of the disclosure.

FIG. 18 depicts an example of fine resolution resource allocation between UL 1810, 1814, 1818, 1822, 1832, 1836, 1840, 1844 and DL 1812, 1816, 1820, 1824, 1830, 1834, 1838, 1842 for RFDD where N_sym1 and N_sym2 are changing across time but N_sym remains the same.

Figure 19:
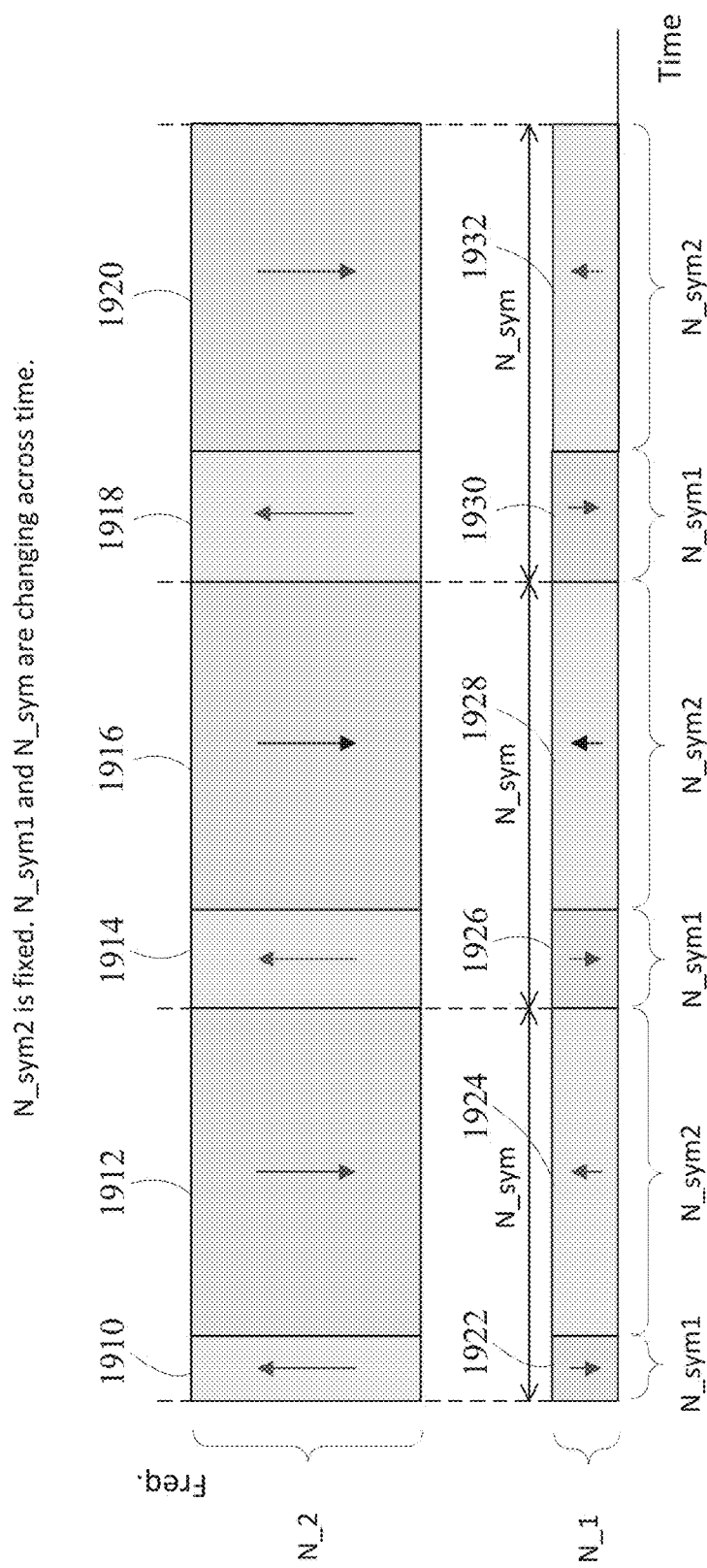
FIG. 19 depicts an example of fine resolution resource allocation between UL and DL for RFDD (where Nsym1 and Nsym do not remain the same across time but Nsym2 remains the same) in accordance with an embodiment of the disclosure.

FIG. 19 depicts an example of RFDD fine resolution resource allocation between UL 1910, 1914, 1918, 1924, 1928, 1932 and DL 1912, 1916, 1920, 1922, 1926, 1930 where N_sym1 and N_sym are changing across time but N_sym2 remains the same.

Three examples, RFDD, STDD, and ATDD have been presented for overhead-efficient massive MIMO systems in non-contiguous bands with frequency-selective channels.

Under the peak transmit power constraint, STDD may have smaller throughput than FDD for low to moderate values of the transmit peak power and the number of BS antennas but it has substantially higher throughput than FDD as the peak transmit power or/and the number of BS antennas increase.

Without the peak transmit power constraint, STDD outperforms FDD. RFDD and ATDD with proper settings substantially outperform FDD.

The instant disclosure gives an example for granularity enhancement of resource adaptation by changing the number of OFDM symbols per UL sub-frame and that per DL sub-frame over several successive frames. In combination with the above change, the number of OFDM symbols per frame (combined UL sub-frame and DL sub-frame) can also be changed over those successive frames. Conventional FDD is incapable of resource adaptation.

The method described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a readonly memory (ROM). The instructions may be executed by a processor (e.g., a digital signal processor (DSP), an application specific integrated circuit (ASIC), a field programmable logic array (FPGA), a graphic processing unit (GPU) or a general purpose CPU).

EQUIVALENTS, EXTENSIONS, ALTERNATIVES AND MISCELLANEOUS

Example embodiments that relate to massive multiple input multiple output systems for non-contiguous bands are thus described. In the foregoing specification, embodiments of the present disclosure have been described with reference to numerous specific details that may vary from implementation to implementation. Thus, the sole and exclusive indicator of what may be the invention, and is intended by the applicants to be the invention, may be the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A multi-input multi-output (MIMO) rotating frequency division duplexing (RFDD) transceiver in non-contiguous frequency bands comprising:
   an adaptive duplex filter;
   a controller coupled to said adaptive duplex filter, to control said adaptive duplex filter such that an uplink frequency band and a downlink frequency band are rotated before each transmission sub-frame, and wherein at least two of the frequency bands are non-contiguous;
   a multi-output adaptive frequency synthesizer coupled to said controller;
   a transmit mixer coupled to said adaptive duplex filter and to said multi-output adaptive frequency synthesizer; and
   a receive mixer coupled to said adaptive duplex filter and to said multi-output adaptive frequency synthesizer,
   wherein the MIMO RFDD transceiver is configured to transmit signals to and receive signals from devices external to the MIMO RFDD transceiver.

2. The MIMO RFDD transceiver in non-contiguous frequency bands of claim 1, wherein one or more of a) said transmit mixer or b) said receive mixer is either a single branch mixer or a dual branch mixer.

3. The MIMO RFDD transceiver in non-contiguous frequency bands of claim 1 wherein said adaptive duplex filter further comprises:
   a higher band pass filter;
   a lower band pass filter; and
   a switch which can perform two modes of connections wherein the first mode connects a transmit mixer output to the input of the lower band pass filter, the output of the lower band pass filter to a transmit antenna, a receive antenna to the input of the higher band pass filter, and the output of the higher band pass filter to the receive mixer, and in the second mode the roles of the higher band pass filter and the lower band pass filter are interchanged.

4. The MIMO RFDD transceiver in non-contiguous frequency bands of claim 1 wherein said multi-output adaptive frequency synthesizer further comprises a switch coupled to said transmit mixer, said receive mixer, and a multi-output frequency synthesizer.

5. The MIMO RFDD transceiver in non-contiguous frequency bands of claim 1
   wherein said controller changes values of two or more of three parameters from a time interval to a next time interval of same or different duration for each frequency band,
   wherein the three parameters are i) the number of orthogonal frequency division multiplexing (OFDM) symbols per uplink (UL) sub-frame, ii) that per downlink (DL) sub-frame, and iii) that per a combined UL sub-frame and DL sub-frame, and
   wherein their values are fixed within a considered time interval before or after an occurrence of a change.

6. The MIMO RFDD transceiver in non-contiguous frequency bands of claim 1
   wherein said controller changes values of two or more of three parameters across any sub-frames within a time interval for each frequency band, and
   wherein the three parameters are i) the number of OFDM symbols per UL sub-frame, ii) that per DL sub-frame, and iii) that per a combined UL sub-frame and DL sub-frame.

7. The MIMO RFDD transceiver in non-contiguous frequency bands of claim 6 wherein a second type is changing values of a set of changing parameters from a time interval to a next time interval of same or different duration.

8. The MIMO RFDD transceiver in non-contiguous frequency bands of claim 1 wherein two or more frequency bands have different bandwidths and a resource adaptation is performed based on a medium-term statistical measure of traffic loads of UL and DL.

9. A multi-input multi-output (MIMO) rotating frequency division duplexing (RFDD) transceiver in non-contiguous bands comprising:
   an adaptive duplex filter;
   a controller coupled to said adaptive duplex filter, wherein an uplink band and a downlink band are rotated before each transmission sub-frame, and wherein at least two of the bands are non-contiguous;
   a multi-output adaptive frequency synthesizer coupled to said controller;
   a transmit mixer coupled to said adaptive duplex filter and to said multi-output adaptive frequency synthesizer; and
   a receive mixer coupled to said adaptive duplex filter and to said multi-output adaptive frequency synthesizer,
   wherein said adaptive duplex filter further comprises:
   a higher band pass filter;
   a lower band pass filter; and
   a switch which can perform two modes of connections wherein the first mode connects a transmit mixer output to the input of the lower band pass filter, the output of the lower band pass filter to a transmit antenna, a receive antenna to the input of the higher band pass filter, and the output of the higher band pass filter to the receive mixer, and in the second mode the roles of the higher band pass filter and the lower band pass filter are interchanged.

10. A multi-input multi-output (MIMO) rotating frequency division duplexing (RFDD) transceiver in non-contiguous bands comprising:
    an adaptive duplex filter;
    a controller coupled to said adaptive duplex filter, wherein an uplink band and a downlink band are rotated before each transmission sub-frame, and wherein at least two of the bands are non-contiguous;
    a multi-output adaptive frequency synthesizer coupled to said controller;

a transmit mixer coupled to said adaptive duplex filter and to said multi-output adaptive frequency synthesizer; and a receive mixer coupled to said adaptive duplex filter and to said multi-output adaptive frequency synthesizer, wherein said controller changes values of two or more of three parameters from a time interval to a next time interval of same or different duration for each band wherein the three parameters are i) the number of orthogonal frequency division multiplexing (OFDM) symbols per uplink (UL) sub-frame, ii) that per downlink (DL) sub-frame, and iii) that per a combined UL sub-frame and DL sub-frame, and wherein their values are fixed within a considered time interval before or after an occurrence of a change.

11. A multi-input multi-output (MIMO) rotating frequency division duplexing (RFDD) transceiver in non-contiguous bands comprising:

an adaptive duplex filter;

a controller coupled to said adaptive duplex filter, wherein an uplink band and a downlink band are rotated before each transmission sub-frame, and wherein at least two of the bands are non-contiguous;

a multi-output adaptive frequency synthesizer coupled to said controller;

a transmit mixer coupled to said adaptive duplex filter and to said multi-output adaptive frequency synthesizer; and a receive mixer coupled to said adaptive duplex filter and to said multi-output adaptive frequency synthesizer, wherein said controller changes values of two or more of three parameters across any sub-frames within a time interval for each band, and wherein the three parameters are i) the number of OFDM symbols per UL sub-frame, ii) that per DL sub-frame, and iii) that per a combined UL sub-frame and DL sub-frame.

12. The MIMO RFDD transceiver in non-contiguous bands of claim 11 wherein a second type is changing values of a set of changing parameters from a time interval to a next time interval of same or different duration.

* * * * *